United States Patent
Shimizu et al.

[11] Patent Number: 5,750,454
[45] Date of Patent: May 12, 1998

[54] CATALYST COMPOSITION AND PROCESS FOR THE PRODUCTION OF OLEFINIC POLYMERS

[75] Inventors: Hiroyuki Shimizu; Akira Sano; Kazuo Matsuura, all of Kawasaki, Japan

[73] Assignee: Nippon Oil Co., Ltd., Tokyo, Japan

[21] Appl. No.: 655,513

[22] Filed: May 30, 1996

[30] Foreign Application Priority Data

May 31, 1995 [JP] Japan .................................. 7-157100

[51] Int. Cl.$^6$ ..................................................... C08F 4/64
[52] U.S. Cl. ................... 502/114; 502/117; 502/152; 526/153; 526/160; 526/943
[58] Field of Search ........................ 502/114, 117, 502/152; 526/153, 160

[56] References Cited

U.S. PATENT DOCUMENTS

| | | | |
|---|---|---|---|
| 5,021,382 | 6/1991 | Malpass, Jr. ........................ | 502/117 |
| 5,331,071 | 7/1994 | Kataokd et al. ...................... | 526/128 |
| 5,422,325 | 6/1995 | Jejelowo et al. ..................... | 502/104 |
| 5,451,555 | 9/1995 | Tajima et al. ....................... | 502/103 |
| 5,554,704 | 9/1996 | Burkhardt et al. .................... | 526/153 |

FOREIGN PATENT DOCUMENTS

| | | |
|---|---|---|
| 0 546 690 A1 | 6/1993 | European Pat. Off. . |
| 0 569 249 A3 | 11/1993 | European Pat. Off. . |
| 0 587 440 A3 | 3/1994 | European Pat. Off. . |
| 587440 | 4/1994 | European Pat. Off. . |
| 0 608 137 A3 | 7/1994 | European Pat. Off. . |
| 58-19309 | 2/1983 | Japan . |
| 63-251405 | 10/1988 | Japan . |

*Primary Examiner*—David W. Wu
*Attorney, Agent, or Firm*—Panitch Schwarze Jacobs & Nadel, P.C.

[57] ABSTRACT

A catalyst comprises a composition resulting from mutual contact of the following Components (A), (B), (C) and (D):

said Component (A) being a reaction product resulting from mutual contact of components (a), (b) and (c);

said component (a) being represented by the formula $$Me^1R^1_p(OR^2)_qX^1_{4-p-q} \quad \text{I}$$

wherein $R^1$ and $R^2$ each are a $C_1$–$C_{24}$ hydrocarbon moieties, $X^1$ is a hydrogen atom or a halogen atom, $Me^1$ is titanium, zirconium or hafnium, p and q are $0 \leq p \leq 4$, $0 \leq q \leq 4$ and $0 \leq p+q \leq 4$, said component (b) being represented by the formula $$Me^2R^3_m(OR^4)_nX^2_{z-m-n} \quad \text{II}$$

wherein $R^3$ and $R^4$ each are a $C_1$–$C_{24}$ hydrocarbon moieties, $X^2$ is a hydrogen atom or a halogen atom, $Me^2$ is an element of Groups I to III in the Periodic Table, z is a valence of $Me^2$, and m and n are $0 \leq m \leq z$, $0 \leq n \leq z$ and $0 < m+n \leq z$, and said component (c) being an organocyclic compound having two or more conjugated double bonds;

said Component (B) being a modified organoaluminum compound having Al—O—Al bonds;

said Component (C) being an organocyclic compound having two or more conjugated double bonds; and said Component (D) being an inorganic carrier or particulate polymer carrier. The disclosed catalyst find extensive use in the manufacture of olefinic polymers having a relatively high molecular weight and a relatively wide molecular weight distribution as well as olefinic copolymers having a relatively narrow composition distribution.

17 Claims, No Drawings

1

CATALYST COMPOSITION AND PROCESS FOR THE PRODUCTION OF OLEFINIC POLYMERS

BACKGROUND OF THE INVENTION

1. Field of the Invention

This invention relates to a catalyst and a process using the same for the production of olefinic polymers. The term olefinic polymers as used herein denotes both homopolymers and copolymers of olefinic hydrocarbons.

2. Prior Art

As disclosed in Japanese Patent Laid-Open Publication No. 58-19309, it has been proposed to produce ethylene homopolymers or ethylene-α-olefin copolymers among various polyolefins with use of a catalyst composition comprising a zirconium compound, typically a metallocene compound and an aluminoxane compound. This prior art catalyst is liable to form such a homopolymer or copolymer which is of a narrow molecular weight distribution and a low molecular weight and such a copolymer which has a relatively narrow composition distribution. However, the quality of polyolefins demanded by the relevant industry is such that they have a satisfactorily high molecular weight and a relatively wide molecular weight distribution and, in the case of copolymers, a narrow composition distribution.

With consideration given solely to an increase in the molecular weight of polyolefins, this may be achieved to some extent by the use of a selected metallocene compound. Japanese Laid-Open Patent Publication No. 63-251405 discloses the use of a dicyclopentadienyl hafnium compound. However, this hafnium compound is rather difficult to synthesize and inferior in catalytic activity to a dicyclopentadienyl zirconium compound. The hafnium compound is further disadvantageous in that the resultant polymers have a relatively narrow molecular weight distribution and, in the case of copolymers, fail to provide a composition distribution as narrow as desired.

SUMMARY OF THE INVENTION

The present inventors have found a novel solid catalyst composition which is capable of higher catalytic activity and conducive to the formation of higher molecular weight polymers compared to the prior art counterparts.

The invention provides a polymerization catalyst useful for the production of olefinic polymers which comprises a composition resulting from mutual contact of the following Components (A), (B), (C) and (D):

said Component (A) being a reaction product resulting from mutual contact of components (a), (b) and (c);
said component (a) being represented by the formula $$Me^1 R^1_p (OR^2)_q X^1_{4-p-q} \qquad \text{I}$$

wherein $R^1$ and $R^2$ each are a $C_1$–$C24$ hydrocarbon moieties, $X^1$ is a hydrogen atom or a halogen atom, $Me^1$ is titanium, zirconium or hafnium, p and q are $0 \leq p \leq 4$, $0 \leq q \leq 4$ and $0 \leq p+q \leq 4$, said component (b) being represented by the formula $$Me^2 R^3_m (OR^4)_n X^2_{z-m-n} \qquad \text{II}$$

wherein $R^3$ and $R^4$ each are a $C_1$–$C_{24}$ hydrocarbon moieties, $X^2$ is a hydrogen atom or a halogen atom, $Me^2$ is an element of Groups I to III in the Periodic Table, z is a valence of $Me^2$, and m and n are $0 \leq m \leq z$, $0 \leq n \leq z$ and $0 < m+n \leq z$, and said component (c) being an organocyclic compound having two or more conjugated double bonds;
said Component (B) being a modified organoaluminum compound having a Al—O—Al bond;
said Component (C) being an organocyclic compound having two or more conjugated double bonds; and
said Component (D) being an inorganic and/or particulate polymer carrier.

The process according to the present invention is characterized by polymerizing or copolymerizing olefins in the presence of the above solid catalyst. The catalysts provided in accordance with the invention contribute to the production of olefinic polymers having increased molecular weight, wide and controllable molecular weight distribution and narrow composition distribution when the resultant product is a copolymer such as typically an ethylene-α-olefin copolymer. Furthermore, the polymers produced with use of the inventive catalyst excel in granular properties such as reduced tackiness, increased bulk density and narrow grain distribution.

DETAILED DESCRIPTION OF THE INVENTION

The component (A) of the catalyst composition of the invention is a reaction product of components (a), (b) and (c). The component (a) is represented by the formula $$Me^1 R^1_p (OR^2)_q X^1_{4-p-q} \qquad \text{I}$$

where $R^1$ and $R^2$ each are $C_1$–$C_{24}$, preferably $C_1$–$C_{12}$, more preferably $C_1$–$C_8$ straight or branched hydrocarbon groups including an alkyl group such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl, octyl or the like, an alkenyl group such as vinyl, allyl or the like, an aryl group such as phenyl, tolyl, xylyl, mesityl, indenyl, naphthyl or the like, and an aralkyl group such as benzyl, trityl, phenethyl, styryl, benzhydryl, phenylbutyl, phenylpropyl, neophyl or the like.

$X^1$ is a halogen atom such as fluorine, iodine, chlorine and bromine or a hydrogen atom. $Me^1$ denotes zirconium (Zr), titanium (Ti) and hafnium (Hf). Zirconium is preferred for the purpose of the invention. p and q are $0 \leq p \leq 4$ and $0 \leq q \leq 4$, respectively and $0 \leq p+q \leq 4$, preferably $0 < p+q \leq 4$.

The component (a) exemplarily and specifically includes tetramethyl zirconium, tetraethyl zirconium, tetrapropyl zirconium, tetra-n-butyl zirconium, tetrapentyl zirconium, tetraphenyl zirconium, tetratolyl zirconium, tetrabenzyl zirconium, tetraallyl zirconium, tetraneophyl zirconium, tetramethoxy zirconium, tetraethoxy zirconium, tetrapropoxy zirconium, tetraisopropoxy zirconium, tetrabutoxy zirconium, tetraisobutoxy zirconium, tetratertbutoxy zirconium, tetrasecbutoxy zirconium, tetrapentyloxy zirconium, tetrahexyloxy zirconium, tetraphenoxy zirconium, tetratolyloxy zirconium, tetrabenzyloxy zirconium, tetraallyloxy zirconium, tetraneophyloxy zirconium, tetrachloro zirconium, trimethylmonochlorozirconium, triethylmonochlorozirconium, tripropylmonochlorozirconium, tri-n-butylmonochlorozirconium, tripentylmonochlorozirconium, triphenylmonochlorozirconium, tritolylmonochlorozirconium, tribenzylmonochlorozirconium, triallylmonochlorozirconium, trineophylmonochlorozirconium, dimethyldichlorozirconium, diethyldichlorozirconium, dipropyldichlorozirconium, di-n-butyldichlorozirconium, dipentyldichlorozirconium, diphenyldichlorozirconium, ditolyldichlorozirconium, dibenzyldichlorozirconium, diallyldichlorozirconium, dineophyldichlorozirconium, monomethyltrichlorozirconium, monoethyltrichlorozirconium, monopropyltrichlorozirconium, mono-n-butyltrichlorozirconium, monopentyltrichlorozirconium, monophenyltrichlorozirconium, monotolyltrichlorozirconium, monobenzyltrichlorozirconium, monoallyltrichlorozirconium, mononeophyltrichlorozirconium, trimethoxymonochlorozirconium, dimethoxydichlorozirconium, monomethoxytrichlorozirconium, triethoxymonochlorozirconium, diethoxydichlorozirconium, monoethoxytrichlorozirconium, tripropoxymonochlorozirocnium, dipropoxydichlorozirconium, monopropoxytrichlorozirconium, tri-n-butoxymonochlorozirconium, di-n-butoxydichlorozirconium, mono-n-butoxytrichlorozirconium, tripentyloxymonochlorozirconium, dipentyloxydichlorozirconium, monopentyloxytrichlorozirconium, triphenoxymonochlorozirconium, diphenoxydichlorozirconium, monophenoxytrichlorozirconium, tritolyloxymonochlorozirconium, ditolyloxydichlorozirconium, monotolyloxytrichlorozirconium, tribenzyloxymonochlorozirconium, dibenzyloxydichlorozirconium, monobenzyloxytrichlorozirconium, triallyloxymonochlorozirconium, diallyloxydichlorozirconium, monoallyloxytrichlorozirconium, trineophyloxymonochlorozirconium, dineophyloxydichlorozirconium, mononeophyloxytrichlorozirconium, tetrabromozirconium, trimethylmonobromozirconium, triethylmonobromozirconium, tripropylmonobromozirconium, tri-n-butylmonobromozirconium, tripentylmonobromozirconium, triphenylmonobromozirconium, tritolylmonobromozirconium, tribenzylmonobromozirconium, triallylmonobromozirconium, trineophylmonobromozirconium, dimethyldibromozirconium, diethyldibromozirconium, dipropyldibromozirconium, di-n-butyldibromozirconium, dipentyldibromozirconium, diphenyldibromozirconium, ditolyldibromozirconium, dibenzyldibromozirconium, diallyldibromozirconium, dineophyldibromozirconium, monomethyltribromozirconium, monoethyltribromozirconium, monopropyltribromozirconium, mono-n-butyltribromozirconium, monopentyltribromozirconium, monophenyltribromozirconium, monotolyltribromozirconium, monobenzyltribromozirconium, monoallyltribromozirconium, mononeophyltribromozirconium, trimethoxymonobromozirconium, dimethoxydibromozirconium, monomethoxytribromozirconium, triethoxymonobromozirconium, diethoxydibromozirconium, monoethoxytribromozirconium, tripropoxymonobromozirconium, dipropoxydibromozirconium, monopropoxytribromozirconium, tri-n-butoxymonobromozirconium, di-n-butoxydibromozirconium, mono-n-butoxytribromozirconium, tripentyloxymonobromozirconium, dipentyloxydibromozirconium, monopentyloxytribromozirconium, triphenoxymonobromozirconium, diphenoxydibromozirconium, monophenoxytribromozirconium, tritolyloxymonobromozirconium, ditolyloxydibromozirconium, monotolyloxytribromozirconium, tribenzyloxymonobromozirconium, dibenzyloxydibromozirconium, monobenzyloxytribromozirconium, triallyloxymonobromozirconium, diallyloxydibromozirconium, monoallyloxytribromozirconium, trineophyloxymonobromozirconium, dineophyloxydibromozirconium, mononeophyloxytribromozirconium, tetraiodozirconium, trimethylmonoiodozirconium, triethylmonoiodozirconium, tripropylmonoiodozirconium, tri-n-butylmonoiodozirconium, tripentylmonoiodozirconium, triphenylmonoiodozirconium, tritolylmonoiodozirconium, tribenzylmonoiodozirconium, triallylmonoiodozirconium, trineophylmonoiodozirconium, dimethyldiiodozirconium, diethyldiiodozirconium, dipropyldiiodozirconium, di-n-butyldiiodozirconium, dipentyldiiodozirconium, diphenyldiiodozirconium, ditolyldiiodozirconium, dibenzyldiiodozirconium, diallyldiiodozirconium, dineophyldiiodozirconium, monomethyltriiodozirconium, monoethyltriiodozirconium, monopropyltriiodozirconium, mono-n-butyltriiodozirconium, monopentyltriiodozirconium, monophenyltriiodozirconium, monotolyltriiodozirconium, monobenzyltriiodozirconium, monoallyltriiodozirconium, mononeophyltriiodozirconium, trimethoxymonoiodozirconium, dimethoxydiiodozirconium, monomethoxytriiodozirconium, triethyoxymonoiodozirconium, diethoxydiiodozirconium, monoethoxytriiodozirconium, tripropoxymonoiodozirconium, dipropoxydiiodozirconium, monopropoxytriiodozirconium, tri-n-butoxymonoiodozirconium, di-n-butoxydiiodozirconium, mono-n-butoxytriiodozirconium, tripentyloxymonoiodozirconium, dipentyloxydiiodozirconium, monopentyloxytriiodozirconium, triphenoxymonoiodozirconium, diphenoxydiiodozirconium, monophenoxytriiodozirconium, tritolyloxymonoiodozirconium, ditolyloxydiiodozirconium, monotolyloxytriiodozirconium, tribenzyloxymonoiodozirconium, dibenzyloxydiiodozirconium, monobenzyloxytriiodozirconium, triallyloxymonoiodozirconium, diallyloxydiiodozirconium, monoallyloxytriiodozirconium.

trineophyloxymonoiodozirconium,
dineophyloxydiiodozirconium,
mononeophyloxytriiodozirconium,
tribenzylmonomethoxyzirconium,
tribenzylmonoethoxyzirconium,
tribenzylmonopropoxyzirconium,
tribenzylmonobutoxyzirconium,
tribenzylmonopetyloxyzirconium,
tribenzylmonophenoxyzirconium,
tribenzylmonotolyloxyzirconium,
tribenzylmonobenzyloxyzirconium,
tribenzylmonoallyloxyzirconium,
tribenzylmononeophyloxyzirconium,
dibenzyldimethoxyzirconium, dibenzyldiethoxyzirconium,
dibenzyldipropoxyzirconium, dibenzyldibutoxyzirconium,
dibenzyldipetyloxyzirconium,
dibenzyldiphenoxyzirconium,
dibenzylditolyloxyzirconium,
dibenzyldibenzyloxyzirconium,
dibenzyldiallyloxyzirconium,
dibenzyldineophyloxyzirconium,
monobenzyltrimethoxyzirconium,
monobenzyltriethoxyzirconium,
monobenzyltripropoxyzirconium,
monobenzyltributoxyzirconium,
monobenzyltripetyloxyzirconium,
monobenzyltriphenoxyzirconium,
monobenzyltritolyloxyzirconium,
monobenzyltribenzyloxyzirconium,
monobenzyltriallyloxyzirconium,
monobenzyltrineophyloxyzirconium,
trineophylmonomethoxyzirconium,
trineophylmonoethoxyzirconium,
trineophylmonopropoxyzirconium,
trineophylmonobutoxyzirconium,
dineophyldimethoxyzirconium,
dineophyldiethoxyzirconium,
dineophyldipropoxyzirconium,
dineophyldibutoxyzirconium,
dineophyldiphenoxyzirconium,
mononeophyltrimethoxyzirconium,
mononeophyltriethoxyzirconium,
mononeophyltripropoxyzirconium,
mononeophyltributoxyzirconium,
mononeophyltriphenoxyzirconium, zirconiumtetrahydride,
zirconiummonohydridetrimethoxide,
zirconiummonohydridetriethoxide,
zirconiummonohydridetripropoxide,
zirconiummonohydridetributoxide,
zirconiumdihydridedimethoxide,
zirconiumdihydridediethoxide,
zirconiumdihydridedipropoxide,
zirconiumdihydridedibutoxide,
zirconiumtrihydridemonomethoxide,
zirconiumtrihydridemonoethoxide,
zirconiumtrihydridemonopropoxide,
zirconiumrihydridemonobutoxide,
zirconiummonohydridetrichloride,
zirconiummonohydridetribromide,
zirconiummonohydridetriiodide,
zirconiummonohydridetrifluoride,
zirconiumdihydridedichloride,
zirconiumdihydridedibromide, zirconiumdihydridediiodide,
zirconiumdihydridedifluoride,
zirconiumtrihydridemonochloride,
zirconiumtrihydridemonobromide,
zirconiumtrihydridemonoiodide,
zirconiumtrihydridemonofluoride,
zirconiummonohydridetrimethyl,
zirconiummonohydridetribenzyl,
zirconiummonohydridetriphenyl,
zirconiumdihydridedimethyl, zirconiumdihydridedibenzyl,
zirconiumdihydridediphenyl,
zirconiumtrihydridemonomethyl,
zirconiumtrihydridemonobenzyl,
zirconiumtrihydridemonophenyl,
zirconiummonohydridedimethoxidemonochloride,
zirconiummonohydridediethoxidemonochloride,
zirconiummonohydridedipropoxidemonochloride,
zirconiummonohydridedibutoxidemonochloride,
zirconiumdihydridemonomethoxidemonochloride,
zirconiumdihydridemonoethoxidemonochloride,
zirconiumdihydridemonopropoxidemonochloride,
zirconiumdihydridemonobutoxidemonochloride,
zirconiummonohydridedimethoxidemonomethyl,
zirconiummonohydridediethoxidemonobenzyl,
zirconiummonohydridedipropoxidemonophenyl,
zirconiumdihydridemonomethoxidemonomethyl,
zirconiumdihydridemonoethoxidemonobenzyl,
zirconiumdihydridemonopropoxidemonophenyl,
zirconiummonohydridemonomethoxidemonochloridemonobenzyl, zirconiummonohydridemonomethoxidemonochloridemonophenyl,
zirconiummonohydridemonomethoxidemonochloridemonomethyl, tetramethyl titanium, tetraethyl titanium, tetrapropyl titanium, tetra-n-butyl titanium, tetrapentyl titanium, tetraphenyl titanium, tetratolyl titanium, tetrabenzyl titanium, tetraallyl titanium, tetraneophyl titanium, tetramethoxy titanium, tetraethoxy titanium, tetrapropoxy titanium, tetrabutoxy titanium, tetrapentyloxy titanium, tetraphenoxy titanium, tetratolyloxy titanium, tetrabenzyloxy titanium, tetraallyloxy titanium, tetraneophyloxy titanium, tetrachloro titanium, trimethylmonochlorotitanium, triethylmonochlorotitanium, tripropylmonochlorotitanium, tri-n-butylmonochlorotitanium, tripentylmonochlorotitanium, triphenylmonochlorotitanium, tritolylmonochlorotitanium, tribenzylmonochlorotitanium, triallylmonochlorotitanium, trineophylmonochlorotitanium, dimethyldichlorotitanium, diethyldichlorotitanium, dipropyldichlorotitanium, di-n-butyldichlorotitanium, dipentyldichlorotitanium, diphenyldichlorotitanium, ditolyldichlorotitanium, dibenzyldichlorotitanium, diallyldichlorotitanium, dineophyldichlorotitanium, monomethyltrichlorotitanium, monoethyltrichlorotitanium, monopropyltrichlorotitanium, mono-n-butyltrichlorotitanium, monopentyltrichlorotitanium, monophenyltrichlorotitanium, monotolyltrichlorotitanium, monobenzyltrichlorotitanium, monoallyltrichlorotitanium, mononeophyltrichlorotitanium, trimethoxymonochlorotitanium, dimethoxydichlorotitanium, monomethoxytrichlorotitanium, triethoxymonochlorotitanium, diethoxydichlorotitanium, monoethoxytrichlorotitanium, tripropoxymonochlorotitanium, dipropoxydichlorotitanium, monopropoxytrichlorotitanium, tri-n-butoxymonochlorotitanium, di-n-butoxydichlorotitanium, mono-n-butoxytrichlorotitanium, tripentyloxymonochlorotitanium, dipentyloxydichlorotitanium, monopentyloxytrichlorotitanium, triphenoxymonochlorotitanium, diphenoxydichlorotitanium, monophenoxytrichlorotitanium, tritolyloxymonochlorotitanium, ditolyloxydichlorotitanium, monotolyloxytrichlorotitanium, tribenzyloxymonochlorotitanium, dibenzyloxydichlorotitanium, monobenzyloxytrichlorotitanium, triallyloxymonochlorotitanium, diallyloxydichlorotitanium, monoallyloxytrichlorotitanium, trineophyloxymonochlorotitanium, dineophyloxydichlorotitanium, mononeophyloxytrichlorotitanium, tetrabromotitanium, trimethylmonobromotitanium, triethylmonobromotitanium, tripropylmonobromotitanium, tri-n-butylmonobromotitanium, tripentylmonobromotitanium, triphenylmonobromotitanium, tritolylmonobromotitanium, tribenzylmonobromotitanium, triallylmonobromotitanium, trineophylmonobromotitanium, dimethyldibromotitanium, diethyldibromotitanium, dipropyldibromotitanium, di-n-butyldibromotitanium, dipentyldibromotitanium, diphenyldibromotitanium, ditolyldibromotitanium, dibenzyldibromotitanium, diallyldibromotitanium, dineophyldibromotitanium, monomethyltribromotitanium, monoethyltribromotitanium, monopropyltribromotitanium, mono-n-butyltribromotitanium, monopentyltribromotitanium, monophenyltribromotitanium, monotolyltribromotitanium, monobenzyltribromotitanium, monoallyltribromotitanium, mononeophyltribromotitanium, trimethoxymonobromotitanium, dimethoxydibromotitanium, monomethoxytribromotitanium, triethoxymonobromotitanium, diethoxydibromotitanium, monoethoxytribromotitanium, tripropoxymonobromotitanium, dipropoxydibromotitanium, monopropoxytribromotitanium, tri-n-butoxymonobromotitanium, di-n-butoxydibromotitanium, mono-n-butoxytribromotitanium, tripentyloxymonobromotitanium, dipentyloxydibromotitanium, monopentyloxytribromotitanium, triphenoxymonobromotitanium, diphenoxydibromotitanium, monophenoxytribromotitanium, tritolyloxymonobromotitanium, ditolyloxydibromotitanium, monotolyloxytribromotitanium, tribenzyloxymonobromotitanium, dibenzyloxydibromotitanium, monobenzyloxytribromotitanium, triallyloxymonobromotitanium, diallyloxydibromotitanium, monoallyloxytribromotitanium, trineophyloxymonobromotitanium, dineophyloxydibromotitanium, mononeophyloxytribromotitanium, tetraiodotitanium, trimethylmonoiodotitanium, triethylmonoiodotitanium, tripropylmonoiodotitanium, tri-n-butylmonoiodotitanium, tripentylmonoiodotitanium, triphenylmonoiodotitanium, tritolylmonoiodotitanium, tribenzylmonoiodotitanium, triallylmonoiodotitanium, trineophylmonoiodotitanium, dimethyldiiodotitanium, diethyldiiodotitanium, dipropyldiiodotitanium, di-n-butyldiiodotitanium, dipentyldiiodotitanium, diphenyldiiodotitanium, ditolyldiiodotitanium, dibenzyldiiodotitanium, diallyldiiodotitanium, dineophyldiiodotitanium, monomethyltriiodotitanium, monoethyltriiodotitanium, monopropyltriiodotitanium, mono-n-butyltriiodotitanium, monopentyltriiodotitanium, monophenyltriiodotitanium, monotolyltriiodotitanium, monobenzyltriiodotitanium, monoallyltriiodotitanium, mononeophyltriiodotitanium, trimethoxymonoiodotitanium, dimethoxydiiodotitanium, monomethoxytriiodotitanium, triethyoxymonoiodotitanium, diethoxydiiodotitanium, monoethoxytriiodotitanium, tripropoxymonoiodotitanium, dipropoxydiiodotitanium, monopropoxytriiodotitanium, tri-n-butoxymonoiodotitanium, di-n-butoxydiiodotitanium, mono-n-butoxytriiodotitanium, tripentyloxymonoiodotitanium, dipentyloxydiiodotitanium, monopentyloxytriiodotitanium, triphenoxymonoiodotitanium, diphenoxydiiodotitanium, monophenoxytriiodotitanium, tritolyloxymonoiodotitanium, ditolyloxydiiodotitanium, monotolyloxytriiodotitanium, tribenzyloxymonoiodotitanium, dibenzyloxydiiodotitanium, monobenzyloxytriiodotitanium, triallyloxymonoiodotitanium, diallyloxydiiodotitanium, monoallyloxytriiodotitanium, trineophyloxymonoiodotitanium, dineophyloxydiiodotitanium, mononeophyloxytriiodotitanium, tribenzylmonomethoxytitanium, tribenzylmonoethoxytitanium, tribenzylmonopropoxytitanium, tribenzylmonobutoxytitanium, tribenzylmonopetyloxytitanium, tribenzylmonophenoxytitanium, tribenzylmonotolyoxytitanium, tribenzylmonobenzyloxytitanium, tribenzylmonoallyloxytitanium, tribenzylmononeophyloxytitanium, dibenzyldimethoxytitanium, dibenzyldiethoxytitanium, dibenzyldipropoxytitanium, dibenzyldibutoxytitanium, dibenzyldipetyloxytitanium, dibenzyldiphenoxytitanium, dibenzylditolyloxytitanium, dibenzyldibenzyloxytitanium, dibenzyldiallyloxytitanium, dibenzyldineophyloxytitanium, monobenzyltrimethoxytitanium, monobenzyltriethoxytitanium, monobenzyltripropoxytitanium, monobenzyltributoxytitanium, monobenzyltripetyloxytitanium, monobenzyltriphenoxytitanium, monobenzyltritolyloxytitanium, monobenzyltribenzyloxytitanium, monobenzyltriallyloxytitanium, monobenzyltrineophyloxytitanium, trineophylmonomethoxytitanium, trineophylmonoethoxytitanium, trineophylmonopropoxytitanium, trineophylmonobutoxytitanium, dineophyldimethoxytitanium, dineophyldiethoxytitanium, dineophyldipropoxytitanium, dineophyldibutoxytitanium, dineophyldiphenoxytitanium, mononeophyltrimethoxytitanium, mononeophyltriethoxytitanium, mononeophyltripropoxytitanium, mononeophyltributoxytitanium, mononeophyltriphenoxytitanium, tetramethyl hafnium, tetraethyl hafnium, tetrapropyl hafnium, tetra-n-butyl hafnium, tetrapentyl hafnium, tetraphenyl hafnium, tetratolyl hafnium, tetrabenzyl hafnium, tetraallyl hafnium, tetraneophyl hafnium, tetramethoxy hafnium, tetraethoxy hafnium, tetrapropoxy hafnium, tetrabutoxy hafnium, tetrapentyloxy hafnium, tetraphenoxy hafnium, tetratolyloxy hafnium, tetrabenzyloxy hafnium, tetraallyloxy hafnium, tetraneophyloxy hafnium, tetrachloro hafnium, trimethylmonochlorohafnium, triethylmonochlorohafnium, tripropylmonochlorohafnium, tri-n-butylmonochlorohafnium, tripentylmonochlorohafnium, triphenylmonochlorohafnium, tritolylmonochlorohafnium, tribenzylmonochlorohafnium, triallylmonochlorohafnium, trineophylmonochlorohafnium, dimethyldichlorohafnium, diethyldichlorohafnium, dipropyldichlorohafnium, di-n-butyldichlorohafnium, dipentyldichlorohafnium, diphenyldichlorohafnium, ditolyldichlorohafnium, dibenzyldichlorohafnium, diallyldichlorohafnium, dineophyldichlorohafnium, monomethyltrichlorohafnium, monoethyltrichlorohafnium, monopropyltrichlorohafnium, mono-n-butyltrichlorohafnium, monopentyltrichlorohafnium, monophenyltrichlorohafnium, monotolyltrichlorohafnium, monobenzyltrichlorohafnium, monoallyltrichlorohafnium, mononeophyltrichlorohafnium, trimethoxymonochlorohafnium, dimethoxydichlorohafnium, monomethoxytrichlorohafnium, triethoxymonochlorohafnium, diethoxydichlorohafnium, monoethoxytrichlorohafnium, tripropoxymonochlorohafnium, dipropoxydichlorohafnium, monopropoxytrichlorohafnium, tri-n-butoxymonochlorohafnium, di-n-butoxydichlorohafnium, mono-n-butoxytrichlorohafnium, tripentyloxymonochlorohafnium, dipentyloxydichlorohafnium, monopentyloxytrichlorohafnium, triphenoxymonochlorohafnium, diphenoxydichlorohafnium, monophenoxytrichlorohafnium, tritolyloxymonochlorohafnium, ditolyloxydichlorohafnium, monotolyloxytrichlorohafnium, tribenzyloxymonochlorohafnium, dibenzyloxydichlorohafnium, monobenzyloxytrichlorohafnium, triallyloxymonochlorohafnium, diallyloxydichlorohafnium, monoallyloxytrichlorohafnium, trineophyloxymonochlorohafnium, dineophyloxydichlorohafnium, mononeophyloxytrichlorohafnium, tetrabromohafnium, trimethylmonobromohafnium, triethylmonobromohafnium, tripropylmonobromohafnium, tri-n-butylmonobromohafnium, tripentylmonobromohafnium, triphenylmonobromohafnium, tritolylmonobromohafnium, tribenzylmonobromohafnium, triallylmonobromohafnium, trineophylmonobromohafnium, dimethyldibromohafnium, diethyldibromohafnium, dipropyldibromohafnium, di-n-butyldibromohafnium, dipentyldibromohafnium, diphenyldibromohafnium, ditolyldibromohafnium, dibenzyldibromohafnium, diallyldibromohafnium, dineophyldibromohafnium, monomethyltribromohafnium, monoethyltribromohafnium, monopropyltribromohafnium, mono-n-butyltribromohafnium, monopentyltribromohafnium, monophenyltribromohafnium, monotolyltribromohafnium, monobenzyltribromohafnium, monoallyltribromohafnium, mononeophyltribromohafnium, trimethoxymonobromohafnium, dimethoxydibromohafnium, monomethoxytribromohafnium, triethoxymonobromohafnium, diethoxydibromohafnium, monoethoxytribromohafnium, tripropoxymonobromohafnium, dipropoxydibromohafnium, monopropoxytribromohafnium, tri-n-butoxymonobromohafnium, di-n-butoxydibromohafnium, mono-n-butoxytribromohafnium, tripentyloxymonobromohafnium, dipentyloxydibromohafnium, monopentyloxytribromohafnium, triphenoxymonobromohafnium, diphenoxydibromohafnium, monophenoxytribromohafnium, tritolyloxymonobromohafnium, ditolyloxydibromohafnium, monotolyloxytribromohafnium, tribenzyloxymonobromohafnium, dibenzyloxydibromohafnium, monobenzyloxytribromohafnium, triallyloxymonobromohafnium, diallyloxydibromohafnium, monoallyloxytribromohafnium, trineophyloxymonobromohafnium, dineophyloxydibromohafnium, mononeophyloxytribromohafnium, tetraiodohafnium, trimethylmonoiodohafnium, triethylmonoiodohafnium, tripropylmonoiodohafnium, tri-n-butylmonoiodohafnium, tripentylmonoiodohafnium, triphenylmonoiodohafnium, tritolylmonoiodohafnium, tribenzylmonoiodohafnium, triallylmonoiodohafnium, trineophylmonoiodohafnium, dimethyldiiodohafnium, diethyldiiodohafnium, dipropyldiiodohafnium, di-n-butyldiiodohafnium, dipentyldiiodohafnium, diphenyldiiodohafnium, ditolyldiiodohafnium, dibenzyldiiodohafnium, diallyldiiodohafnium, dineophyldiiodohafnium, monomethyltriiodohafnium, monoethyltriiodohafnium, monopropyltriiodohafnium, mono-n-butyltriiodohafnium, monopentyltriiodohafnium, monophenyltriiodohafnium, monotolyltriiodohafnium, monobenzyltriiodohafnium, monoallyltriiodohafnium, mononeophyltriiodohafnium, trimethoxymonoiodohafnium, dimethoxydiiodohafnium, monomethoxytriiodohafnium, triethyoxymonoiodohafnium, diethoxydiiodohafnium, monoethoxytriiodohafnium, tripropoxymonoiodohafnium, dipropoxydiiodohafnium, monopropoxytriiodohafnium, tri-n-butoxymonoiodohafnium, di-n-butoxydiiodohafnium, mono-n-butoxytriiodohafnium, tripentyloxymonoiodohafnium, dipentyloxydiiodohafnium, monopentyloxytriiodohafnium, triphenoxymonoiodohafnium, diphenoxydiiodohafnium, monophenoxytriiodohafnium, tritolyloxymonoiodohafnium, ditolyloxydiiodohafnium, monotolyloxytriiodohafnium, tribenzyloxymonoiodohafnium, dibenzyloxydiiodohafnium, monobenzyloxytriiodohafnium, triallyloxymonoiodohafnium, diallyloxydiiodohafnium, monoallyloxytriiodohafnium, trineophyloxymonoiodohafnium, dineophyloxydiiodohafnium, mononeophyloxytriiodohafnium, tribenzylmonomethoxyhafnium, tribenzylmonoethoxyhafnium, tribenzylmonopropoxyhafnium, tribenzylmonobutoxyhafnium, tribenzylmonopetyloxyhafnium, tribenzylmonophenoxyhafnium, tribenzylmonotolyoxyhafnium, tribenzylmonobenzyloxyhafnium, tribenzylmonoallyloxyhafnium, tribenzylmononeophyloxyhafnium, dibenzyldimethoxyhafnium, dibenzyldiethoxyhafnium, dibenzyldipropoxyhafnium, dibenzyldibutoxyhafnium, dibenzyldipetyloxyhafnium, dibenzyldiphenoxyhafnium, dibenzylditolyloxyhafnium, dibenzyldibenzyloxyhafnium, dibenzyldiallyloxyhafnium, dibenzyldineophyloxyhafnium, monobenzyltrimethoxyhafnium, monobenzyltriethoxyhafnium,
monobenzyltripropoxyhafnium,
monobenzyltributoxyhafnium,
monobenzyltripetyloxyhafnium,
monobenzyltriphenoxyhafnium,
monobenzyltritolyloxyhafnium,
monobenzyltribenzyloxyhafnium,
monobenzyltriallyloxyhafnium,
monobenzyltrineophyloxyhafnium,
trineophylmonomethoxyhafnium,
trineophylmonoethoxyhafnium,
trineophylmonopropoxyhafnium,
trineophylmonobutoxyhafnium,
dineophyldimethoxyhafnium, dineophyldiethoxyhafnium,
dineophyldipropoxyhafnium, dineophyldibutoxyhafnium,
dineophyldiphenoxyhafnium,
mononeophyltrimethoxyhafnium,
mononeophyltriethoxyhafnium,
mononeophyltripropoxyhafnium,
mononeophyltributoxyhafnium, mononeophyltriphenoxyhafnium and the other.

Two or more of the above compounds may be used in combination. Preferred among the above compounds are tetramethyl zirconium, tetraethyl zirconium, tetrabenzyl zirconium, tetrapropoxy zirconium, tetratripropoxymonochlorozirconium, tetrabutoxy zirconium, tetrabutoxy titanium, tetrabutoxy hafnium, tetrachlorozirconium, and more preferred are the compounds represented by the formula $Zr(OR^2)_4$ where $R^2$ is alkyl, such as tetrapropoxy zirconium, tetrabutoxy zirconium and the like.

The component (b) is represented by the formula $$Me^2R^3{}_m(OR^4)_nX^2{}_{z-m-n}$$  II where $Me^2$ is an element of Groups I to III, preferably II to III in the Periodic Table such as lithium, sodium, potassium, magnesium, calcium, zinc, boron and aluminum. $R^3$ and $R^4$ each are $C_1$–$C_{24}$, preferably $C_1$–$C_{12}$, more preferably $C_1$–$C_8$ straight or branched hydrocarbon groups including each alkyl group such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl; each alkenyl group such as vinyl and allyl; each aryl group such as phenyl, tolyl, xylyl, mesityl, indenyl and naphthyl; and each aralkyl group such as benzyl, trityl, phenethyl, styryl, benzhydryl, phenylbutyl, phenylpropyl and neophyl.

$X^2$ is a halogen atom such as fluorine, iodine, chlorine or bromine or a hydrogen atom. In the case where $X^2$ is the hydrogen atom, $Me^2$ is the element of group III in the Periodic Table such as boron, aluminum and the like. The symbol z is a valence of $Me^2$. m and n are $0 \leq m \leq z$ and $0 \leq n \leq z$, respectively, and $0 < m+n \leq z$.

Specific examples of the component (b) include methyllithium, ethyllithium, n-propyllithium, isopropyllithium, n-butyllithium, t-butyllithium, pentyllithium, octyllithium, phenyllithium, benzyllithium, dimethylmagnesium, diethylmagnesium, di-n-propylmagnesium, diisopropylmagnesium, di-n-butylmagnesium, di-t-butylmagnesium, dipentylmagnesium, dioctylmagnesium, diphenylmagnesium, dibenzylmagnesium, methylmagnesiumchloride, ethylmagnesiumchloride, n-propylmagnesiumchloride, isopropylmagnesiumchloride, n-butylmagnesiumchloride, t-butylmagnesiumchloride, pentylmagnesiumchloride, octylmagnesiumchloride, phenylmagnesiumchloride, benzylmagnesiumchloride, methylmagnesiumbromide, methylmagnesiumiodide, ethylmagnesiumbromide, ethylmagnesiumiodide, n-propylmagnesiumbromide, n-propylmagnesiumiodide, isopropylmagnesiumbromide, isopropylmagnesiumiodide, n-butylmagnesiumbromide, n-butylmagnesiumiodide, t-butylmagnesiumbromide, t-butylmagnesiumiodide, pentylmagnesiumbromide, pentylmagnesiumiodide, octylmagnesiumbromide, octylmagnesiumiodide, phenylmagnesiumbromide, phenylmagnesiumiodide, benzylmagnesiumbromide, benzylmagnesiumiodide, dimethylzinc, diethylzinc, di-n-propylzinc, diisopropylzinc, di-n-butylzinc, di-t-butylzinc, dipentylzinc, dioctylzinc, diphenylzinc, dibenzylzinc, trimethylboron, triethylboron, tri-n-propylboron, triisopropylboron, tri-n-butylboron, tri-t-butylboron, tripentylboron, trioctylboron, triphenylboron, tribenzylboron, trimethylaluminum, triethylaluminum, diethylaluminumhydride, diethylaluminumchloride, diethylaluminumbromide, diethylaluminumfluoride, diethylaluminumiodide, ethylaluminumdichloride, ethylaluminumdibromide, ethylaluminumdifluoride, ethylaluminumdiiodide, tripropylaluminum, dipropylaluminumhydride, dipropylaluminumchloride, dipropylaluminumbromide, dipropylaluminumfluoride, dipropylaluminumiodide, diisobutylaluminumhydride, propylaluminumdichloride, propylaluminumdibromide, propylaluminumdifluoride, propylaluminumdiiodide, triisopropylaluminum, diisopropylaluminumchloride, diisopropylaluminumbromide, diisopropylaluminumfluoride, diisopropylaluminumiodide, ethylaluminumsesquichloride, ethylaluminumsesquibromide, propylaluminumsesquichloride, propylaluminumsesquibromide, n-butylaluminumsesquichloride, n-butylaluminumsesquibromide, isopropylaluminumdichloride, isopropylaluminumdibromide, isopropylaluminumdifluoride, isopropylaluminumdiiodide, tributylaluminum, dibutylaluminumchloride, dibutylaluminumbromide, dibutylaluminumfluoride, dibutylaluminumiodide, butylaluminumdichloride, butylaluminumdibromide, butylaluminumdifluoride, butylaluminumdiiodide, tri-sec-butylaluminum, di-sec-butylaluminumchloride, di-sec-butylaluminumbromide, di-sec-butylaluminumfluoride, di-sec-butylaluminumiodide, sec-butylaluminumdichloride, sec-butylaluminumdibromide, sec-butylaluminumdifluoride, sec-butylaluminumdiiodide, tri-tert-butylaluminum, di-tert-butylaluminumchloride, di-tert-butylaluminumbromide, di-tert-butylaluminumfluoride, di-tert-butylaluminumiodide, tert-butylaluminumdichloride, tert-butylaluminumdibromide, tert-butylaluminumdifluoride, tert-butylaluminumdiiodide, triisobutylaluminum, diisobutylaluminumchloride, diisobutylaluminumbromide, diisobutylaluminumfluoride, diisobutylaluminumiodide, isobutylaluminumdichloride, isobutylaluminumdibromide, isobutylaluminumdifluoride, isobutylaluminumdiiodide, trihexylaluminum, dihexylaluminumchloride, dihexylaluminumbromide, dihexylaluminumfluoride, dihexylaluminumiodide, hexylaluminumdichloride, hexylaluminumdibromide, hexylaluminumdifluoride, hexylaluminumdiiodide, tripentylaluminum, dipentylaluminumchloride, dipentylaluminumbromide, dipentylaluminumfluoride, dipentylaluminumiodide, pentylaluminumdichloride, pentylaluminumdibromide, pentylaluminumdifluoride, pentylaluminumdiiodide, tridecylaluminum, methylaluminumdimethoxide, methylaluminumdiethoxide, methylaluminumdipropoxide, methylaluminumdibutoxide, dimethylaluminummethoxide, dimethylaluminumethoxide, dimethylaluminumpropoxide, dimethylaluminumbutoxide, ethylaluminumdimethoxide, ethylaluminumdiethoxide, ethylaluminumdipropoxide, ethylaluminumdibutoxide, diethylaluminummethoxide, diethylaluminumethoxide, diethylaluminumpropoxide, diethylaluminumbutoxide, propylaluminumdimethoxide, propylaluminumdiethoxide, propylaluminumdipropoxide, propylaluminumdibutoxide, dipropylaluminummethoxide, dipropylaluminumethoxide, dirpopylaluminumpropoxide, dipropylaluminumbutoxide, butylaluminumdimethoxide, butylaluminumdiethoxide, butylaluminumdipropoxide, butylaluminumdibutoxide, dibutylaluminummethoxide, dibutylaluminummethoxide, dibutylaluminumpropoxide, dibutylaluminumbutoxide, dimethylaluminumhydride, diethylaluminumhydride, dipropylaluminumhydride, diisopropylaluminumhydride, dibutylaluminumhydride, diisobutylaluminumhydride, dihexylaluminumhydride, dicyclohexylaluminumhydride, methylaluminumdihydride, ethylaluminumdihydride, propylaluminumdihydride, isopropylaluminumdihydride, butylaluminumdihydride, isobutylaluminumdihydride, hexylaluminumdihydride, cyclohexylaluminumdihydride, dimethylboronhydride, diethylboronhydride, methylborondihydride and ethylborondihydride.

Two or more of the above compounds may be used in combination. Preferred among the above compounds are trimethylaluminum, triethylaluminum, diethylaluminumchloride, tripropylaluminum, triisopropylaluminum, tributylaluminum, tri-sec-butylaluminum, tri-tert-butylaluminum, triisobutylaluminum, trihexylaluminum, tripentylaluminum, diisobutylaluminumhydride, tridecylaluminum and the like.

The component (c) is an organocyclic compound having more than two conjugated double-bonds. Eligible for use as the component (c) are as follows:

1) a cyclic hydrocarbon compound having one or more rings having more than two, preferably two to four, more preferably two to three conjugated double-bonds and a total carbon number of 4–24, preferably 4–12.
2) a cyclic hydrocarbon compound similar to the aforesaid hydrocarbon compound which is partially substituted by one to six hydrocarbon groups, typically $C_1$–$C_{12}$ alkyl or aralkyl groups.
3) an organosilicone compound having one or more rings having more than two, preferably two to four, more preferably two to three conjugated double-bonds and a cyclic hydrocarbon group having a total carbon number of 4–24, preferably 4–12.
4) an organosilicone compound obtained by partially substituting the hydrogens of the aforesaid compound 3) by one to six hydrocarbon groups.
5) alkaline metal salts (sodium and lithium salts) of each of the foresaid compounds.

Particularly preferred are such compounds having a cyclopentadiene molecular structure as are represented by the formula

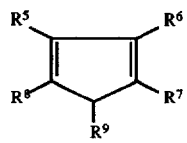
(III)

where $R^5$, $R^6$, $R^7$, $R^8$ and $R^9$ each are hydrogen or a $C_1$–$C_{10}$ hydrocarbon group, any two of these hydrocarbon groups jointly forming a cyclic hydrocarbon group. The $C_1$–$C_{10}$ hydrocarbon groups include each alkyl group such as methyl, ethyl, propyl, isopropyl, butyl, t-butyl, hexyl and octyl; an aryl group such as phenyl; an alkoxy group such as methoxy, ethoxy and propoxy; an aryloxy group such as phenoxy; an aralkyl group such as benzyl.

In the case where any two of the hydrocarbon groups of the formula III jointly form the cyclic hydrocarbon group, the skelton thereof includes cycloheptatriene, aryl and their condensed rings.

Specific compounds of the formula III exemplarily include cyclopentadiene, indene, azulene and their $C_1$–$C_{10}$ alkyl, aryl, aralkyl, alkoxy and aryloxy derivatives, as well as these compounds bonded through alkylene groups of usually 2–8, preferably 2–3 carbon atoms or alkylidene groups of usually 2–8, preferably 2–3 carbon atoms.

The organosilicone compound having a cyclic hydrocarbon group may be represented by the formula

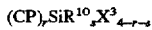
IV where CP is a cyclic hydrocarbon group such as cyclopentadienyl, substituted-cyclopentadienyl, indenyl and substituted-indenyl; $R^{10}$ is hydrogen or a $C_1$–$C_{24}$, preferably $C_1$–$C_{12}$ hydrocarbon residue including an alkyl group such as methyl, ethyl, propyl, isopropyl, butyl, t-butyl, pentyl, hexyl and octyl; an alkenyl group such as vinyl and allyl; an alkoxy group such as methoxy, ethoxy, propoxy and butoxy; an aryl group such as phenyl, tolyl and xylyl; an aryloxy group such as phenoxy; and an aralkyl group such as benzyl, phenetyl, styryl and neophyl; $R^{10}$ further including n-, iso-, s-, t- and neo-isomeric groups; $X^3$ is a halogen atom such as fluorine, iodine, chlorine and bromine; r and s are $0<r \leq 4$, $0 \leq s \leq 3$, preferably $1 \leq r+s \leq 4$.

Eligible organocyclic hydrocarbon compounds for use as the component (c) according to the invention include cyclopolyene or substituted-cyclopolyene of 7–24 carbon atoms such as cyclopentadiene, substituted-cyclopentadiene such as methylcyclopentadiene, ethylcyclopentadiene, t-butylcyclopentadiene, propylcyclopentadiene, isopropylcyclopentadiene, butylcyclopentadiene, isobutylcyclopentadiene, secbutylcyclopentadiene, 1-methyl-3-ethylcyclopentadiene, 1-ethyl-3-methylcyclopentadiene, 1-methyl-3-propylcyclopentadiene, 1-propyl-3-methylcyclopentadiene, 2-ethyl-5-isopropylcyclopentadiene, 2-methyl-5-phenylcyclopentadiene, 2-ethyl-3,5-dimethylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene and pentamethylcyclopentadiene; indene and substituted-indene such as 4-methylindene, 4,7-dimethylindene and 4,5,6,7-tetrahydroindene; cycloheptatriene, substituted-cycloheptatriene such as methylcycloheptatriene; cyclooctatetraene and substituted-cyclooctatetraene such as methylcyclooctatetraene; azulene and substituted-azulene such as methylazulene and ethylazulene; and fluorene and substituted-fluorene such as methylfluorene; and further include dimethylsilirenebiscyclopentadiene, dimethylsilirenebisindene, dimethylsilirenebispropylcyclopentadiene, dimethylsilirenebisbutylcyclopentadiene, diphenylsilirenebiscyclopentadiene, diphenylsilirenebisindene, diphenylsilirenebispropylcyclopentadiene, diphenylsilirenebisbutylcyclopentadiene, monocyclopentadienylsilane, dicyclopentadienylsilane, triscyclopentadienylsilane, tetracyclopentadienylsilane, monocyclopentadienylmonomethylsilane, monocyclopentadienylmonoethylsilane, monocyclopentadienyldimethylsilane, monocyclopentadienyldiethylsilane, monocyclopentadienyltrimethylsilane, monocyclopentadienyltriethylsilane, monocyclopentadienylmonomethoxysilane, monocyclopentadienylmonoethoxysilane, monocyclopentadienylmonophenoxysilane, monocyclopentadienylmonomethylmonochlorosilane, monocyclopentadienylmonoethylmonochlorosilane, monocyclopentadienylmonomethyldichlorosilane, monocyclopentadienylmonoethyldichlorosilane, monocyclopentadienyltrichlorosilane, dicyclopentadienylmonomethylsilane, dicyclopentadienylmonoethylsilane, dicyclopentadienyldimethylsilane, dicyclopentadienyldiethylsilane, dicyclopentadienylmethylethylsilane, dicyclopentadienyldipropylsilane, dicyclopentadienylethylpropylsilane, dicyclopentadienyldiphenylsilane, dicyclopentadienylphenylmethylsilane, dicyclopentadienylmethylchlorosilane, dicyclopentadienylethylchlorosilane, dicyclopentadienyldichlorosilane, dicyclopentadienylmonomethoxysilane, dicyclopentadienylmonoethoxysilane, dicyclopentadienylmonomethoxymonochlorosilane, dicyclopentadienylmonoethoxymonochlorosilane, tricyclopentadienylmonomethylsilane, tricyclopentadienylmonoethylsilane, tricyclopentadienylmonomethoxysilane, tricyclopentadienylmonoethoxysilane, tricyclopentadienylmonochlorosilane, 3-methylcyclopentadienylsilane, bis-3-methylcyclopentadienylsilane, 3-methylcyclopentadienylsilane, 1,2-dimethylcyclopentadienylsilane, 1,3-dimethylcyclopentadienylsilane, 1,2,4-trimethylcyclopentadienylsilane, 1,2,3,4-tetramethylcyclopentadienylsilane, pentamethylcyclopentadienylsilane, monoindenylsilane, diindenylsilane, triindenylsilane, tetraindenylsilane, monoindenylmonomethylsilane, monoindenylmonoethylsilane, monoindenyldimethylsilane, monoindenyldiethylsilane, monoindenyltrimethylsilane, monoindenyltriethylsilane, monoindenylmonomethoxysilane, monoindenylmonoethoxysilane, monoindenylmonophenoxysilane, monoindenylmonomethylmonochlorosilane, monoindenylmonoethylmonochlorosilane, monoindenylmonomethyldichlorosilane, monoindenylmonoethyldichlorosilane, monoindenyltrichlorosilane, diindenylmonomethylsilane, diindenylmonoethylsilane, diindenyldimethylsilane, diindenyldiethylsilane, diindenylmethylethylsilane, diindenyldipropylsilane, diindenylethylpropylsilane, diindenyldiphenylsilane, diindenylphenylmethylsilane, diindenylmethylchlorosilane, diindenylethylchlorosilane, diindenyldichlorosilane, diindenylmonomethoxysilane, diindenylmonoethoxysilane, diindenylmonomethoxymonochlorosilane, diindenylmonoethoxymonochlorosilane, triindenylmonomethylsilane, triindenylmonoethylsilane, triindenylmonomethoxysilane, triindenylmonoethoxysilane, triindenylmonochlorosilane, 3-methylindenylsilane, bis-3-methylindenylsilane, 3-methylindenylmethylsilane, 1,2-dimethylindenylsilane, 1,3-dimethylindenylsilane, 1,2,4-trimethylindenylsilane, 1,2,3,4-tetramethylindenylsilane, pentamethylindenylsilane or the like.

The component (c) further include, as aforesaid, ethylenebiscyclopentadiene, ethylenebispropylcyclopentadiene, ethylenebisbutylcyclopentadiene, isopropylidenebiscyclopentadiene, isopropylidenebisindene, isopropylidenebispropylcyclopentadiene, isopropylidenebisbutylcyclopentadiene, bisindenylethane, bis(4,5,6,7-tetrahydro-1-indenyl)ethane, 1,3-propanedienylbisindene, 1,3-propanedienylbis(4,5,6,7-tetrahydro)indene, propylenebis(1-indene), isopropylidene(1-indenyl)cyclopentadiene, diphenylmethylene(9-fluorenyl)cyclopentadiene, isopropylidenecyclopentadienyl-1-fluorene, or the like.

Preferred are cyclopentadiene, methylcyclopentadiene, ethylcyclopentadiene, t-butylcyclopentadiene, propylcyclopentadiene, isopropylcyclopentadiene, butylcyclopentadiene, isobutylcyclopentadiene, secbutylcyclopentadiene, 1-methyl-3-ethylcyclopentadiene, 1-ethyl-3-methylcyclopentadiene, 1-methyl-3-propylcyclopentadiene, 1-propyl-3-methylcyclopentadiene, 2-ethyl-5-isopropylcyclopentadiene, 2-methyl-5-phenylcyclopentadiene, 2-ethyl-3,5-dimethylcyclopentadiene, 1,3-dimethylcyclopentadiene, 1,2,4-trimethylcyclopentadiene, pentamethylcyclopentadiene, indene, 4-methyl-1-indene, 4,7-dimethylindene, diindenyldimethylsilane and bisindenylethane. Two or more of the above compounds may be used in combination.

The various components (a)–(c) used in the invention may be contacted in the following sequences.

1. components (a) through (c) are all simultaneously contacted together.
2. components (a) and (b) are contacted together and thereafter with component (c).
3. components (b) and (c) are contacted together and thereafter with component (a).
4. components (a) and (c) are contacted together and thereafter with component (b), among which the sequences 1 and 4 are particularly preferred.

The components (a) through (c) may be contacted in an atomsphere of an inert gas such as nitrogen or argon in the presence of an inert liquid hydrocarbon such as an aromatic hydrocarbon (6–12 carbon atoms) including benzene, toluene, xylene and ethylbenzene or an aliphatic or alicyclic hydrocarbon (5–12 carbon atoms) including pentane, hexane, heptane, octane, decane, dodecane and cyclohexane, with or without stirring at a temperature of −100° C.–200° C., preferably 50° C.–150° C. for 30 minutes to 50 hours, preferably 1–24 hours.

Most preferred amongst the listed solvents are the aromatic hydrocarbons because the components (a) through (c) are all soluble therein. If the aromatic hydrocarbon solvent is used in the first stage of each contacting sequence, the components (a) through (c) may be contacted together throughout the stages of contacting sequences without having to remove that particular solvent. Alternatively, the aromatic hydrocarbon may be removed upon completion of the first stage by addition of an insoluble or hardly soluble inert hydrocarbon liquid such as an aliphatic or alicyclic hydrocarbon solvent including pentane, hexane, heptane, octane, decane, dodecane and cyclohexane which allows the reaction product to precipitate and thereafter replaced with any of the aforesaid inert hydrocarbon solvents. Each of the compounds may be subjected to contact operation more than twice.

The component (b) is used in an amount of 0.01–100 moles, preferably 0.1–50 moles, more preferably 1–10 moles per mole of the component (a). The component (c) is used in an amount of 0.01–100 moles, preferably 0.1–50, more preferably 1–10 moles per mole of the component (a).

The Component (B) is a modified organoaluminum compound having Al—O—Al bonds resulting from the reaction of an organoaluminum compound with water. It has in its molecule an Al—O—Al bond numbering from 1 to 100, preferably from 1 to 50. The reaction is effected usually in the presence of an inert hydrocarbon, typically an aliphatic hydrocarbon such as pentane, hexane, heptane or the like, an alicyclic hydrocarbon such as cyclohexane, methylcyclohexane or the like, or an aromatic hydrocarbon such as benzene, toluene, xylene or the like. Particularly preferred are the aliphatic and aromatic hydrocarbons.

The starting organoaluminum compound may be represented by the formula

$$R^{11}_{c}AlX^{4}_{3-c} \qquad V$$

where $R^{11}$ is a hydrocarbon group such as an alkyl, alkenyl, aryl and aralkyl group of 1 to 18, preferably 1 to 12 carbon atoms; $X^4$ is a halogen or hydrogen atom; and c is an integer of $1 \leq c \leq 3$. Trialkylaluminums are preferred in which the alkyl group is a methyl, ethyl, propyl, isopropyl, butyl, isobutyl, pentyl, hexyl, octyl, decyl or dodecyl group among which the methyl group is most preferred.

The water/organoaluminum reaction takes place in a molar ratio of water:Al in the range of 0.25:1 to 1.2:1, preferably 0.5:1 to 1:1 at a temperature of usually −70° C. to 100° C., preferably −20° C. to 20° C. for a period of 5 minutes to 24 hours, preferably 10 minutes to 5 hours. As water for reaction with the organoaluminum compound, there may be used a water of crystallization contained in a hydrate such as copper sulfate hydrate, aluminum sulfate hydrate or the like. It has been found that methylaluminoxane, a reaction product of an alkylaluminum and water, is particularly suitable source as Component B. Any of the above modified organoaluminum compounds may be used in combination.

Component (C) is an organocyclic compound having more than two conjugated double-bonds. Eligible for use as Component (C) are any of the aforementioned component (c), among which the compounds represented by the formula III are preferred. Particularly preferred are cyclopentadiene and alkyl derivatives thereof such as methylcyclopentadiene, ethylcyclopentadiene, t-butylcyclopentadiene, propylcyclopentadiene, isopropylcyclopentadiene, butylcyclopentadiene, isobutylcyclopentadiene, secbutylcyclopentadiene, 1-methyl-3-ethylcyclopentadiene, 1-ethyl-3-methylcyclopentadiene, 1-methyl-3-propylcyclopentadiene, 1-propyl-3-methylcyclopentadiene, 2-ethyl-5-isopropylcyclopentadiene, 2-methyl-5-phenylcyclopentadiene, 2-ethyl-3,5-dimethylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene or the like. Furthermore, the preferred Component (C) includes ethylenebiscyclopentadiene, ethylenebispropylcyclopentadiene, ethylenebisbutylcyclopentadiene, ethylenebisindene, isopropylidenebiscyclopentadiene, isopropylidenebispropylcyclopentadiene, isopropylidenebisbutylcyclopentadiene, isopropylidenebisindene or the like and dimethylsilirenebiscyclopentadiene, dimethylsilirenebisindene, dimethylsilirenebispropylcyclopentadiene, dimethylsilirenebisbutylcyclopentadiene, diphenylsilirenebiscyclopentadiene, diphenylsilirenebisindene, diphenylsilirenebispropylcyclopentadiene, diphenylsilirenebisbutylcyclopentadiene or the like. In the preparation of the inventive catalyst, the compounds used for Component (C) and component (c) may be the same but preferably different.

Component (D) is an inorganic and/or particulate polymer carrier. The inorganic carrier may be intrinsically in the form of powder, granule, flake, foil or fiber, but whatever the shape may be, it should be 5–200 μm, preferably 10–100 μm in maximum length. The inorganic carrier is preferably porous, having a surface area of 50–1,000 m²/g and a pore volume of 0.05–3 cm³/g. It may be chosen from the group of a carbonaceous material, a metal, a metal oxide, a metal chloride and a metal carbonate, or a mixture thereof, which is calcined usually at 200°–900° C. in the air, or an inert gas such as nitrogen, or argon. Suitable metals for the inorganic carrier are aluminum and nickel. Eligible metal oxides are Group I–VIII metal oxides of the Periodic Table including $SiO_2$, $Al_2O_3$, MgO, CaO, $B_2O_3$, $TiO_2$, $ZrO_2$, $Fe_2O_3$, $SiO_2 \cdot Al_2O_3$, $Al_2O_3 \cdot MgO$, $Al_2O_3 \cdot CaO$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$ and $SiO_2 \cdot MgO$. The double oxides are not particularly restricted in terms of structure and component ratio when used in the invention. The metal oxides may have adsorbed thereto small quantities of moisture and may further contain a small amount of impurities.

The metal chloride used in the invention is a chloride of an alkaline metal or alkaline earth metal, preferably $MgCl_2$ and $CaCl_2$. Examples of the metal carbonate are magnesium carbonate, calcium carbonate and barium carbonate, while those of the carbonaceous material referred to herein are carbonblack and activated carbon. The above metal oxides are most preferred amongst the other inorganic carrier materials.

Preferred are the metal oxide, silica and alumina.

The term particulate polymer as used herein as a catalyst support or carrier designates a solid particulate form of either thermoplastic or thermosetting resin having an average particle size 5–2,000 μm, preferably 10–100 μm, practically ranging from low molecular weight to ultra high molecular weight polymers as long as these polymers remain solid during the stages of catalyst preparation and polymerization reaction. The starting polymer suitably has a molecular weight in the range of between 1,000 and 3,000,000 dependent upon the type chosen. Specific examples of the particulate polymer include polyolefins preferably of 2–12 carbon atoms such as particulate ethylene polymers, ethylene alpha-olefin copolymers, propylene polymers or copolymers, poly-1buten or the like, polyester, polyamide, polyvinylchloride, polymethylmethacrylate, polymethylacrylate, polystyrene, polynorbornen and naturally occurring polymers as well as mixtures thereof.

The foregoing inorganic and particulate polymer carriers may be used per se as Component (D) according to the invention. Alternatively, they may be pretreated with an organoaluminum compound such as trimethylaluminum, triethylaluminum, triisobutylaluminum, tri-n-hexylaluminum, dimethylaluminumchloride, diethylaluminumchloride, diethylmonoethoxyaluminum, triethoxyaluminum or the like, a modified organoaluminum compound having Al—O—Al bonds, or a silane compound. Eligible for pretreatment of the inorganic carrier are an active hydrogen-containing compound such as alcohol and aldehydes, an electron-donative compound such as ester and ether, or an alcoxide-containing compound such as tetraalcoxysilicate, tetraalcoxyaluminum and transition-metal tetraalcoxide.

The carriers may be contacted with various pretreating compounds in an atmosphere of an inert gas such as nitrogen or argon in the presence of an inert liquid hydrocarbon such as an aromatic hydrocarbon (6–12 carbon atoms) including benzene, toluene, xylene and ethylbenzene or an aliphatic or alicyclic hydrocarbon (5–12 carbon atoms) including pentane, hexane, heptane, octane, decane, dodecane and cyclohexane, with or without stirring at a temperature of −100°–200° C., preferably −50°–100° C. for 30 minutes to 50 hours, preferably 1–24 hours. This pretreatement reaction is carried out preferably in the presence of a solvent of an aromatic hydrocarbon such as benzene, toluene, xylene and ethylbenzene in which the pretreating compounds are rendered soluble. The resulting carrier may be readily put to use for the preparation of catalyst components without having to remove the solvent. If the pretreating compound, for example a modified organoaluminum compound, is insoluble or hardly soluble, there may be added pentane, hexane, heptane, octane, decane, dodecane or cyclohexane to allow the reaction product to precipitate and thereafter dry. Alternatively, part or all of the aromatic hydrocabon solvent may be removed as by means of drying.

The amount of the pretreating compound is usually 0.01–10,000 millimoles, preferably 0.1–100 millimoles (or Al atom concentration in the case of a modified aluminum compound) per gram of the carrier.

Preferred combinations of the various Components (A)–(D) for preparation of the inventive catalysts are shown below by way of example.

Combination 1 component (a):
  tetraalcoxyzirconium such as tetramethoxyzirconium and tetrabutoxyzirconium
component (b):
  trialkylaluminum such as trimethylaluminum, triethylaluminum and triisobutylaluminum
component (c):
  indene and indene derivative such as methylindene and cyclopentadiene and cyclopentadiene derivative such as methylcyclopentadiene and dimethylcyclopentadiene
Component (B):
  methylaluminoxane
Component (C):
  alkyl substituted-cyclopentadiene such as cyclopentadiene, methylcyclopentadiene, ethylcyclopentadiene, t-butylcyclopentadiene, propylcyclopentadiene, isopropylcyclopentadiene, butylcyclopentadiene, isobutylcyclopentadiene, secbutylcyclopentadiene, 1-methyl-3-ethylcyclopentadiene, 1-ethyl-3-methylcyclopentadiene, 1-methyl-3-propylcyclopentadiene, 1-propyl-3-methylcyclopentadiene, 2-ethyl-5-isopropylcyclopentadiene, 2-methyl-5-phenylcyclopentadiene, 2-ethyl-3,5-dimethylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene and pentamethylcyclopentadiene.
Component (D):
  silica, alumina, silica-alumina and polyethylenepowder Combination 2 component (a):
  tetraalkylzirconium such as tetramethylzirconium, tetrabenzylzirconium tetraneophylzirconium and tetraphenylzirconium
component (b):
  trialkylaluminum such as trimethylaluminum, triethylaluminum and triisobutylaluminum
component (c):
  the same as in combination 1
Component (B):
  the same as in combination 1
Component (C):
  the same as in combination 1
Component (D):
  the same as in combination 1

Combination 3 component (a):
  the same as in combination 1
component (b):
  dialkylaluminumhydride such as diethylaluminumhydride and dibutylaluminumhydride
component (c):
  the same as in combination 1
Component (B):
  the same as in combination 1
Component (C):
  the same as in combination 1
Component (D):
  the same as in combination 1

Combination 4 component (a):
  the same as in combination 2
component (b):
  trialkylaluminum such as trimethylaluminum, tributylaluminum and trihexylaluminum
component (c):
  the same as in combination 1
Component (B):
  the same as in combination 1
Component (C):
  the same as in combination 3
Component (D):
  the same as in combination 2

Combination 5 component (a):
  the same as in combination 1
component (b):
  the same as in combination 4
component (c):
  compounds such as cyclopentadiene derivatives including isopropylenecyclopentadiene, indene derivatives including ethylenebizindene and fluorene derivatives including diphenylsilylene(1-cyclopentadienyl)- fluoren that are bonded through an alkylene or sylyrene group.

Component (B):
the same as in combination 1

Component (C):
the same as in combination 1

Component (D):
the same as in combination 1

Combination 6 component (a):
alkoxychlorozirconium such as trimethoxyzirconiumchloride and dibutoxyzirconiumchloride component (b):
the same as in combination 1 component (c):
the same as in combination 1

Component (B):
the same as in combination 1

Component (C):
the same as in combination 1

Component (D):
the same as in combination 1

Combination 7 component (a):
the same as in combination 1 component (b):
the same as in combination 1 component (c):
the same as in combination 1

Component (B):
the same as in combination 1

Component (C):
alkyl substituted-cyclopentadiene such as cyclopentadiene, methylcyclopentadiene, propylcyclopentadiene, isopropylcyclopentadiene, butylcyclopentadiene, isobutylcyclopentadiene, secbutylcyclopentadiene, 1-methyl-3-ethylcyclopentadiene, 1-ethyl-3-methylcyclopentadiene, 1-methyl-3-propylcyclopentadiene, 1-propyl-3-methylcyclopentadiene, 2-ethyl-5-isopropylcyclopentadiene, 2-methyl-5-phenylcyclopentadiene, 2-ethyl-3,5-dimethylcyclopentadiene, 1,2-dimethylcyclopentadiene, 1,3-dimethylcyclopentadiene, 1,2,4-trimethylcyclopentadiene, 1,2,3,4-tetramethylcyclopentadiene and pentamethylcyclopentadiene Component (D):
the same as in combination 1

Combination 8 component (a):
the same as in combination 2 component (b):
alkyllithum and alkylmagnesium compounds such as butyllithum, methyllithum, dibutylmagnesium and ethylmagnesium component (c):
the same as in combination 1

Component (B):
the same as in combination 1

Component (C):
the same as in combination 1

Component (D):
the same as in combination 1

Combination 9 component (a):
the same as in combination 1 component (b):
the same as in combination 1 component (c):
the same as in combination 1

Component (B):
the same as in combination 1

Component (C):
alkyl substituted-cyclopentadiene such as cyclopentadiene, methylcyclopentadiene, propylcyclopentadiene, isopropylcyclopentadiene, butylcyclopentadiene, isobutylcyclopentadiene, secbutylcyclopentadiene, 1-methyl-3-ethylcyclopentadiene, 1-ethyl-3-methylcyclopentadiene, 1-methyl-3-propylcyclopentadiene, 1-propyl-3-methylcyclopentadiene, 2-ethyl-5-isopropylcyclopentadiene, 2-methyl-5-phenylcyclopentadiene, 2-ethyl-3,5-dimethylcyclopentadiene, 1,2-dimethylcyclopentadiene, 1,2,4-trimethylcyclopentadiene, 1,2,3,4-tetramethylcyclopentadiene and pentamethylcyclopentadiene Component (D):
the same as in combination 1

Combination 10 component (a):
the same as in combination 2 component (b):
the same as in combination 4 component (c):
the same as in combination 1

Component (B):
the same as in combination 1

Component (C):
the same as in combination 1

Component (D):
the same as in combination 1

Combination 11 component (a):
the same as in combination 1 component (b):
the same as in combination 1 component (c):
the same as in combination 5

Component (B):
the same as in combination 1

Component (C):
the same as in combination 1

Component (D):
the same as in combination 1

The inventive catalyst compositions are prepared by mutually contacting the Component (A) consisting of the reaction product of the components (a)–(c) and the Components (B)–(D). There is no particular restriction imposed upon the order of mutual contact of the Components (A)–(D). The Components (A)–(C) may be contacted together first and then with the Component (D), or the Components (A), (B) and (D) may be first contacted together and thereafter with the Component (C). Specific examples of such sequences are indicated for the sake of brevity by the arrows as follows:

1. (A)←(B)←(C)←(D)
2. (A)←(B)←(D)←(C)
3. (A)←(C)←(B)←(D)
4. (A)←(C)←(D)←(B)
5. (A)←(D)←(B)←(C)
6. (A)←(D)←(C)←(B)
7. (B)←(A)←(C)←(D)
8. (B)←(A)←(D)←(C)
9. (B)←(C)←(A)←(D)
10. (B)←(C)←(D)←(A)
11. (B)←(D)←(A)←(C)
12. (B)←(D)←(C)←(A)
13. (C)←(A)←(B)←(D)
14. (C)←(A)←(D)←(B)
15. (C)←(B)←(A)←(D)
16. (C)←(B)←(D)←(A)
17. (C)←(D)←(A)←(B)
18. (C)←(D)←(B)←(A)
19. (D)←(A)←(B)←(C)
20. (D)←(A)←(C)←(B)
21. (D)←(B)←(A)←(C)
22. (D)←(B)←(C)←(A)
23. (D)←(C)←(A)←(B)
24. (D)←(C)←(B)←(A)
25. Add (A) through (E) simultaneously.
26. Add (D) to a mixture of (A), (B) and (C).
27. Add (C) to a mixture of (A), (B) and (D).
28. Add (B) to a mixture of (A), (C) and (D).
29. Add (A) to a mixture of (B), (C) and (D).
30. Add a mixture of (C) and (D) to a mixture of (A) and (B).
31. Add a mixture of (A) and (C) to a mixture of (B) and (D).
32. Add a mixture of (B) and (C) to a mixture of (A) and (D).
33. Add a mixture of (A) and (D) to a mixture of (B) and (C).
34. Add a mixture of (A) and (C) to a mixture of (B) and (D).
35. Add a mixture of (A) and (B) to a mixture of (C) and (D).

Preferred are the sequences 1, 2, 3, 7, 8 11 and 12.

The amount of Component (B) is represented by the atomic ratio of aluminum in Component (B) to transition metal $Me^1$ in component (a) which is 0.1 to 100,000, preferably 1 to 10,000, more preferably 10 to 1,000. The amount of Component (C) is 0.01 to 100 mols, preferably 0.1 to 50 mols, more preferably 1 to 10 mols per mol of the component (a). The amount of Component (D) is 1 gram per 0.0001 to 5 millimol, preferably 0.001 to 0.5 millimol, more preferably 0.01 to 0.1 millimol of the component (a).

These four Components (A) to (D) may be usually contacted in an atmosphere of an inert gas such as nitrogen or argon in the presence of an inert liquid hydrocarbon solvent such as pentane, hexane, heptane, octane, decane, dodecane, cyclohexane, benzene, toluene and xylene at a temperature of −100° to 200° C., preferably −50° to 100° C., for a period of 5 minutes to 50 hours, preferably 10 minutes to 24 hours.

In the case where each of Components (A) through (D) is contacted together in the inert hydrocarbon solvents, the resultant catalyst compositions may be put to use together with part or all of the solvents. Alternatively, there may also be used the catalyst compositions maintained in solid phase by means of precipitation and drying. The contacting operation may be carried out more than twice. Components (A), (C) and (D) may be first contacted together externally of the polymerization reaction system and then contacted with Component (B) within the polymerization reaction system.

Starting olefins useful for the purpose of the invention are α-olefins, cyclic olefins, diene, trienes and stylene homologs.

Eligible α-olefins are those having a carbon number of 2 to 12, preferably 2 to 8, and chosen from the group of ethylene, propylene, butene-1, hexene-1, 4-methylpentene-1 and the like. They may be homopolymerized or copolymerized as by alternating, random or block copolymerization processes.

Exemplified as α-olefin copolymers are those of ethylene with an α-olefin comonomer of a carbon number of 3 to 12, preferably 3 to 8, such as ethylene-propylene, ethylene-butene-1, ethylene-hexene-1 or ethylene-4-methylpentene-1, or of propylene with an α-olefin comonomer of a carbon number of 3 to 12, preferably 3 to 8, such as propylene-butene-1, propylene-4-methylpentene-1, propylene-3-methylbutene-1, propylene-hexene-1 or propylene-octene-1. In either copolymer, the content of the comonomer may be variable within the range of less than 90% by mol of total monomer. Generally, ethylene-based copolymers have a comonomer content of not more than 40%, preferably smaller than 30%, more preferably below 20%, whereas propylene-based copolymers have a similar content in the range of 1 to 90%, preferably 5 to 90%, more preferably 10 to 70%, each such percentage being by mol based on total monomer.

The cyclic olefins are chosen from those having a carbon number of 3–24, preferably 3–18, exemplarily including cyclopentene, cyclobutene, cyclohexene, 3-methylcyclohexene, cyclooctene, cyclodecene, cyclododecene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene, ethylidenenorbornene and the like. They may be copolymerized usually with a given α-olefin in which instance the content of the cyclic olefin in the resulting copolymer is less than 50% by mol, usually 1 to 50% by mol, preferably 2 to 50% by mol.

Suitable dienes and trienes are chain polyene of the formula

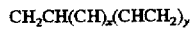
$$CH_2CH(CH)_x(CHCH_2)_y \qquad \text{VI}$$

wherein x is an integer of 1 or 2, and y is 0–20, preferably 2–20.

Examples of the above polyenes include butadiene, 1,4-hexadiene, 1,5-hexadiene, 1,9-decadiene, 1,13-tetradecadiene, 2,6-dimethyl-1,5-heptadiene, 2-methyl-2,7-octadiene, 2,7-dimethyl-2,6-octadiene and 1,5,9-decatriene.

Chain dienes or trienes copolymerizable with a given α-olefin are usually contained in the copolymer in an amount of 0.1 to 50% by mol, preferably 0.2 to 10% by mol.

Eligible styrene homologs are styrene and styrene derivatives such as t-butylstyrene, α-methylstyrene, p-methylstyrene, divinylbenzene, 1,1-diphenylethylene, N,N-dimethyl-p-aminoethylstyrene, N,N-diethyl-p-aminoethylstyrene and the like.

The catalyst of the invention may be suitably used to reform olefin homopolymers or copolymers by further polymerization with a polar monomer such as an unsaturated carboxylate including methyl acrylate, methyl methacrylate, butyl methacrylate, dimethyl maleate, diethyl maleate, monomethyl maleate, diethyl fumarate, dimethyl itaconate and the like. The content of the polar monomer in the reformed polymer is usually in the range of 0.1 to 10% by mol, preferably 0.2 to 2% by mol.

The inventive catalyst may be applied to slurry, solution and vapor polymerization processes. Slurry and vapor phase modes of reaction may be conveniently chosen which are conducted in a substantially oxygen-free, moisture-free state and in the presence of or in the absence of an inert solvent such as aliphatic hydrocarbons including hexane, heptane and the like, aromatic hydrocarbons including benzene, toluene, xylene and the like and alicyclic hydrocarbons including cyclohexane, methylcyclohexane and the like. Reaction temperatures may be at from 20° to 200° C., preferably 50° to 100° C., reaction pressures at from atmospheric to 70 kg/cm$^2$G, preferably atmospheric to 20 kg/cm$^2$G and reaction timelengths at from 5 minutes to 10 hours, preferably 5 minutes to 5 hours.

The molecular weight of a polymer to be formed can be effectively controlled by feeding a predetermined amount of hydrogen into the reaction system, although this control may be also effected by adjusting the reaction temperature, molar ratio of the catalyst and other parameters.

There may be used some scavengers for removing moisture from the reaction system. Such scavengers include an organoaluminum such as trimethylaluminum, triethylaluminum and triisobutylaluminum, the aforesaid modified organoaluminum as well as a modified organoaluminum having a branched alkyl group.

The inventive catalyst may be suitably used for a multistage mode of polymerization involving different hydrogen concentrations, monomer concentrations, polymerization pressures and temperatures and other reaction parameters.

It is also possible to prepare beforehand a pre-catalyst containing a small amount of a polymer (produced according to the invention) and use such pre-catalyst for full-scale polymerization of olefins.

The invention will be further described by way of the following examples.

Preparation of Modified Organoaluminum Compound (Methylaluminoxane)

13 grams of cupric sulfate pentahydrate were taken into a 300 ml three-necked flask equipped with an electromagnetic stirrer and suspended in 50 ml of toluene. 150 ml of trimethylaluminum (1 mmol/ml concentration) were added in droplets to the resulting suspension at 0° C. over 2 hours. Reaction was continued at 25° C. for 24 hours.

The reaction product was filtrated with toluene removed, thereby obtaining 4 grams of methylaluminoxane (MAO) in the form of a white crystal.

Evaluation of Polymer Properties

Melt Index (MI): measured in accordance with ASTM D 1238-57T at 190° C. with load of 2.16 kg Density: measured in accordance with ASTM D 1505-68

EXAMPLE 1

Preparation of Catalyst Components

A 100 ml eggplant-typed flask equipped with a electromagnetic induction stirrer was fed with 30 ml refined toluene, 0.13 gram tetrapropoxyzirconium (Zr(On—Pr)$_4$) and 0.37 gram indene in nitrogen atmosphere. The admixture after being stirred at room temperature for 30 minutes was added at 0° C. and for 30 minutes with droplets of 0.37 gram triethylaluminum (AlEt$_3$) and thereafter stirred at room temperature for 24 hours thereby obtaining Component (A). Component (B) of 40 ml toluene solution of methylaluminoxane (concentration 1 mmol/ml) was added to the solution of Component (A) and reacted together at room temperature for one hour, followed by addition of Component (C) of 0.075 gram dimethylcyclopentadiene (Me$_2$Cp). The resulting admixture was disposed still at room temperature for one day and designated to "Solution A".

A 300 ml three-necked flask equipped with a stirrer was fed in nitrogen atmosphere with 10 grams silica (surface area 300 m$^2$/g, Grade No. 952 of Fuji Davison) which had been calcined at 600° C. for 5 hours, followed by addition of total weight of Solution A. The admixture was stirred at room temperature for 2 hours and thereafter dried by nitrogen blow to remove the solvent therefrom thereby obtaining a particulate product having a good property.

Polymerization

A 3 litter stainless steel autoclave equipped with a stirrer was purged with nitrogen and thereafter charged with 0.3 mmol triethylaluminum for scavenging. The resulting reaction system was heated up to a temperature of 75° C. and disposed still for 30 minutes, followed by addition of 0.5 mg (Zr) of the above solid catalyst. A mix of ethylene and butene-1 gases (butene-1/ethylene molar ratio 0.15) was charged to bring the reactor pressure up to 9 kgf/cm$^2$G, whereupon polymerization reaction was initiated and continued for 2 hours with continued charge of a mixed gas of ethylene and butene-1 (butene-1/ethylene molar ratio 0.05) to maintain the reaction system at 9 kgf/cm$^2$G.

Upon completion of the reaction, excess gas was removed from the reactor which was then cooled to provide 43.5 grams of a white polymer. Analysis indicated a catalytic activity of 87 kg/gZr, a metal flow rate (MFR) of 0.67 g/10 min, a bulk density of 0.45 g/cm$^3$ and a density of 0.9199 g/cm$^3$.

EXAMPLE 2

Preparation of Catalyst Components

A 100 ml eggplant-typed flask equipped with a electromagnetic induction stirrer was fed with 30 ml refined toluene, 0.13 gram tetrapropoxyzirconium (Zr(On—Pr)$_4$) and 0.37 gram indene. The admixture after being stirred at room temperature for 30 minutes was added at 0° C. and for 30 minutes with droplets of 0.37 gram triethylaluminum (AlEt$_3$) and thereafter stirred at room temperature for 24 hours thereby obtaining Component (A). Component (B) of 40 ml toluene solution of methylaluminoxane (concentration 1 mmol/ml) was added to the solution of Component (A) and reacted together at room temperature for one hour, followed by addition of Component (C) of 0.150 gram dimethylcyclopentadiene (Me$_2$Cp). The resulting admixture was disposed still at room temperature for one day and designated to "Solution B".

A 300 ml three-necked flask equipped with a stirrer was fed in nitrogen atmosphere with 10 grams silica (surface area 300 m$^2$/g, Grade No. 952 of Fuji Davison) which had been calcined at 600° C. for 5 hours, followed by addition of total weight of Solution B. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 46.5 grams of polymer having a catalytic activity of 93 kg/gZr, MFR of 0.42 g/10 min, a bulk density of 0.46 g/cm$^3$ and a density of 0.9190 g/cm$^3$.

EXAMPLE 3

Preparation of Catalyst Components

A 100 ml eggplant-typed flask equipped with a electromagnetic induction stirrer was fed with 30 ml refined toluene, 0.15 gram tetrabutoxyzirconium (Zr(On—Bu)$_4$) and 0.26 gram cyclopentadiene. The admixture after being stirred at room temperature for 30 minutes was added at 0°

C. and for 30 minutes with droplets of 1.13 gram trihexylaluminum (AlHx₃) and thereafter stirred at room temperature for 24 hours thereby obtaining Component (A). Component (B) of 20 ml toluene solution of methylaluminoxane (concentration 1 mmol/ml) was added to the solution of Component (A) and reacted together at room temperature for one hour, followed by addition of Component (C) of 0.075 gram dimethylcyclopentadiene (Me$_2$Cp). The resulting admixture was disposed still at room temperature for one day and designated to "Solution C".

A 300 ml three-necked flask equipped with a stirrer was fed in nitrogen atmosphere with 10 grams silica (surface area 300 m$^2$/g, Grade No. 952 of Fuji Davison) which had been calcined at 600° C. for 5 hours, followed by addition of total weight of Solution C. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 39.0 grams of polymer having a catalytic activity of 78 kg/gZr, MFR of 0.81 g/10 min, a bulk density of 0.46 g/cm$^3$ and a density of 0.9204 g/cm$^3$.

EXAMPLE 4

Preparation of Catalyst Components

A 100 ml eggplant-typed flask equipped with a electromagnetic induction stirrer was fed with 30 ml refined toluene, 0.15 gram tetrabutoxyzirconium (Zr(On—Bu)$_4$) and 0.26 gram cyclopentadiene. The admixture after being stirred at room temperature for 30 minutes was added at 0° C. and for 30 minutes with droplets of 1.13 gram trihexylaluminum (AlHx$_3$) and thereafter stirred at room temperature for 24 hours thereby obtaining Component (A). Component (B) of 20 ml toluene solution of methylaluminoxane (concentration 1 mmol/ml) was added to the solution of Component (A) and reacted together at room temperature for one hour, followed by addition of Component (C) of 0.150 gram dimethylcyclopentadiene (Me$_2$Cp). The resulting admixture was disposed still at room temperature for one day and designated to "Solution D".

A 300 ml three-necked flask equipped with a stirrer was fed in nitrogen atmosphere with 10 grams silica (surface area 300 m$^2$/g, Grade No. 952 of Fuji Davison) which had been calcined at 600° C. for 5 hours, followed by addition of total weight of Solution D. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 42.5 grams of polymer having a catalyst activity of 85 kg/gZr, MFR of 0.45 g/10 min, a bulk density of 0.46 g/cm$^3$ and a density of 0.9189 g/cm$^3$.

EXAMPLE 5

Preparation of Catalyst Components

A 100 ml eggplant-typed flask equipped with a electromagnetic induction stirrer was fed with 30 ml refined toluene, 0.11 gram tetraethoxyzirconium (Zr(OEt)$_4$) and 0.37 gram indene. The admixture after being stirred at room temperature for 30 minutes was added at 0° C. and for 30 minutes with droplets of 0.79 gram triisobutylaluminum (AliBu$_3$) and thereafter stirred at room temperature for 24 hours thereby obtaining Component (A). Component (B) of 40 ml toluene solution of methylaluminoxane (concentration 1 mmol/ml) was added to the solution of Component (A) and reacted together at room temperature for one hour, followed by addition of Component (C) of 0.053 gram cyclopentadiene (Cp). The resulting admixture was disposed still at room temperature for one day and designated to "Solution E".

A 300 ml three-necked flask equipped with a stirrer was fed in nitrogen atmosphere with 10 grams alumina which had been calcined at 600° C. for 5 hours, followed by addition of total weight of Solution E. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 49.0 grams of polymer having a catalyst activity of 98 kg/gZr, MFR of 1.20 g/10 min, a bulk density of 0.42 g/cm$^3$ and a density of 0.9215 g/cm$^3$.

EXAMPLE 6

Preparation of Catalyst Components

A 100 ml eggplant-typed flask equipped with a electromagnetic induction stirrer was fed with 30 ml refined toluene, 0.11 gram tetraethoxyzirconium (Zr(OEt)$_4$) and 0.37 gram indene. The admixture after being stirred at room temperature for 30 minutes was added at 0C. and for 30 minutes with droplets of 0.79 gram triisobutylaluminum (AliBu$_3$) and thereafter stirred at room temperature for 24 hours thereby obtaining Component (A). Component (B) of 40 ml toluene solution of methylaluminoxane (concentration 1 mmol/ml) was added to the solution of Component (A) and reacted together at room temperature for one hour, followed by addition of Component (C) of 0.106 gram cyclopentadiene (Cp). The resulting admixture was disposed still at room temperature for one day and designated to "Solution F".

A 300 ml three-necked flask equipped with a stirrer was fed in nitrogen atmosphere with 10 grams alumina which had been calcined at 600° C. for 5 hours, followed by addition of total weight of Solution F. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 53.0 grams of polymer having a catalytic activity of 106 kg/gZr, MFR of 0.94 g/10 min, a bulk density of 0.45 g/cm$^3$ and a density of 0.9207 g/cm$^3$.

EXAMPLE 7

Preparation of Catalyst Components

A 100 ml eggplant-typed flask equipped with an electromagnetic induction stirrer was fed in nitrogen atmosphere with 30 ml refined toluene, 0.13 gram tetrapropoxyzirconium (Zr(On—Pr)4) and 0.28 gram indene. The admixture after being stirred at room temperature for 30 minutes was added at 0° C. and for 30 minutes with droplets of 0.63 gram triisobutylaluminum (AliBu$_3$) and thereafter stirred at room temperature for 24 hours thereby obtaining Component (A). 40 ml toluene solution of methylaluminoxane (concentration 1 mmol/ml) was added to the solution of Component (A) and reacted together at room temperature for one hour, the resulting admixture being designated to "Solution G".

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution G. The admixture was stirred at room temperature for 2 hours and thereafter dried by nitrogen blow to remove the solvent therefrom thereby obtaining a particulate product having a good fluidity property. The particulate product was added with the solution of 0.064 gram methylcyclopentadiene (MeCp) diluted with 3 ml hexane and stirred for 2 hours.

Polymerization

The procedure of Example 1 was followed whereby there was obtained 60.0 grams of polymer having a catalytic activity of 120 kg/gZr, MFR of 0.36 g/10 min, a bulk density of 0.44 g/cm$^3$ and a density of 0.9173 g/cm$^3$.

EXAMPLE 8

Preparation of Catalyst Components

A 100 ml eggplant-typed flask equipped with an electromagnetic induction stirrer was fed in nitrogen atmosphere with 30 ml refined toluene, 0.13 gram tetrapropoxyzirconium (Zr(On—Pr)$_4$) and 0.28 gram indene. The admixture after being stirred at room temperature for 30 minutes was added at 0° C. and for 30 minutes with droplets of 0.63 gram triisobutylaluminum (AliBu$_3$) and thereafter stirred at room temperature for 24 hours thereby obtaining Component (A). 40 ml toluene solution of methylaluminoxane (concentration 1 mmol/ml) was added to the solution of Component (A) and reacted together at room temperature for one hour, the resulting admixture being designated to "Solution H".

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution H. The admixture was stirred at room temperature for 2 hours and thereafter dried by nitrogen blow to remove the solvent therefrom thereby obtaining a particulate product having a good fluidity property. The particulate product was added with the solution of 0.128 gram methylcyclopentadiene (MeCp) diluted with 3 ml hexane and stirred for 2 hours.

Polymerization

The procedure of Example 1 was followed whereby there was obtained 75.0 grams of polymer having a catalytic activity of 130 kg/gZr, MFR of 0.35 g/10 min, a bulk density of 0.46 g/cm$^3$ and a density of 0.9162 g/cm$^3$.

EXAMPLE 9

Preparation of Catalyst Components

A 100 ml eggplant-typed flask equipped with an electromagnetic induction stirrer was fed in nitrogen atmosphere with 30 ml refined toluene, 0.11 gram tetraethoxyzirconium (Zr(OEt)$_4$) and 0.42 gram indene. The admixture after being stirred at room temperature for 30 minutes was added at 0° C. and for 30 minutes with droplets of 0.27 gram triethylaluminum (AlEt$_3$) and thereafter stirred at room temperature for 24 hours thereby obtaining Component (A). 30 ml toluene solution of methylaluminoxane (concentration 1 mmol/ml) was added to the solution of Component (A) and reacted together at room temperature for one hour, the resulting admixture being designated to "Solution I".

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution I. The admixture was stirred at room temperature for 2 hours and thereafter dried by nitrogen blow to remove the solvent therefrom thereby obtaining a particulate product having a good fluidity property. The particulate product was added with the solution of 0.064 gram methylcyclopentadiene (MeCp) diluted with 3 ml hexane and stirred for 2 hours.

Polymerization

A 3 litter stainless steel autoclave equipped with a stirrer was purged with nitrogen followed by addition of 0.5 mg (Zr) of the above solid catalyst. A mix of ethylene and butene-1 gases (butene-1/ethylene molar ratio 0.15) was charged to bring the reactor pressure up to 9 kgf/cm$^2$G, whereupon polymerization reaction was initiated and continued for 2 hours with continued charge of a mixed gas of ethylene and butene-1 (butene-1/ethylene molar ratio 0.05) to maintain the reaction system at 9 kgf/cm$^2$G.

Upon completion of the reaction, excess gas was removed from the reactor which was then cooled to yield 39.0 grams of a white polymer. Analysis indicated a catalytic activity of 78 kg/gZr, a metal flow rate (MFR) of 1.32 g/10 min, a bulk density of 0.45 g/cm$^3$ and a density of 0.9193 g/cm$^3$.

EXAMPLE 10

Preparation of Catalyst Components

A 100 ml eggplant-typed flask equipped with an electromagnetic induction stirrer was fed in nitrogen atmosphere with 30 ml refined toluene, 0.11 gram tetraethoxyzirconium (Zr(OEt)$_4$) and 0.42 gram indene. The admixture after being stirred at room temperature for 30 minutes was added at 0° C. and for 30 minutes with droplets of 0.27 gram triethylaluminum (AlEt$_3$) and thereafter stirred at room temperature for 24 hours thereby obtaining Component (A). 30 ml toluene solution of methylaluminoxane (concentration 1 mmol/ml) was added to the solution of Component (A) and reacted together at room temperature for one hour, the resulting admixture being designated to "Solution J".

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution J. The admixture was stirred at room temperature for 2 hours and thereafter dried by nitrogen blow to remove the solvent therefrom thereby obtaining a particulate product having a good fluidity property. The particulate product was added with the solution of 0.128 gram methylcyclopentadiene (MeCp) diluted with 3 ml hexane and stirred for 2 hours.

Polymerization

The procedure of Example 9 was followed whereby there was obtained 44.5 grams of polymer having a catalytic activity of 89 kg/gZr, MFR of 0.85 g/10 min, a bulk density of 0.43 g/cm$^3$ and a density of 0.9176 g/cm$^3$.

EXAMPLE 11

Preparation of Catalyst Components

A 100 ml eggplant-typed flask equipped with an electromagnetic induction stirrer was fed in nitrogen atmosphere with 30 ml refined toluene, 0.13 gram tetrapropoxyzirconium (Zr(On—Pr)$_4$) and 0.37 gram indene. The admixture after being stirred at room temperature for 30 minutes was added at 0° C. and for 30 minutes with droplets of 0.37 gram triethylaluminum (AlEt$_3$) and thereafter stirred at room temperature for 24 hours thereby obtaining Component (A). Component (C) of 0.17 gram propylcyclopentadiene (PrCP) was added to the resulting solution of Component (A) and reacted together at 100° C. for 2 hours and designated to "Solution K". Component (B) of 40 ml toluene solution of methylaluminoxane (concentration 1 mmol/ml) was added to Solution K and reacted together at room temperature for one hour.

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution K. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 160 grams of polymer having a catalytic activity of 320 kg/gZr, MFR of 0.20 g/10 min, a bulk density of 0.46 g/cm$^3$ and a density of 0.9210 g/cm$^3$.

EXAMPLE 12

Preparation of Catalyst Components

The procedure of Example 11 was followed except that 0.20 gram butylcyclopentadiene was used for Component (C).

Polymerization

The procedure of Example 1 was followed whereby there was obtained 120 grams of polymer having a catalytic activity of 240 kg/gZr, MFR of 0.23 g/10 min, a bulk density of 0.47 g/cm$^3$ and a density of 0.9208 g/cm$^3$.

EXAMPLE 13

Preparation of Catalyst Components

The procedure of Example 11 was followed except that 0.30 gram 1,3-dimethylcyclopentadiene was used for Component (C).

Polymerization

The procedure of Example 1 was followed whereby there was obtained 72 grams of polymer having a catalytic activity of 144 kg/gZr, MFR of 0.05 g/10 min, a bulk density of 0.46 g/cm$^3$ and a density of 0.9198 g/cm$^3$.

EXAMPLE 14

Preparation of Catalyst Components

The procedure of Example 11 was followed except that 1.9 gram dimethylsilylenebiscyclopentadiene was used for Component (C).

Polymerization

The procedure of Example 1 was followed whereby there was obtained 52 grams of polymer having a catalytic activity of 104 kg/gZr, MFR of 0.54 g/10 min, a bulk density of 0.45 g/cm$^3$ and a density of 0.9221 g/cm$^3$.

EXAMPLE 15

Preparation of Catalyst Components

A 100 ml eggplant-typed flask equipped with an electro-magnetic induction stirrer was fed in nitrogen atmosphere with 30 ml refined toluene, 0.13 gram tetrapropoxyzirconium (Zr(On—Pr)$_4$) and 0.30 gram 1,3-dimethylcyclopentadiene. The admixture after being stirred at room temperature for 30 minutes was added at 0° C. and for 30 minutes with droplets of 0.37 gram triethylaluminum (AlEt$_3$) and thereafter stirred at room temperature for 24 hours thereby obtaining Component (A). Component (C) of 0.17 gram propylcyclopentadiene (PrCP) was added to the resulting solution of Component (A) and reacted together at 100° C. for 2 hours and designated to "Solution L". Component (B) of 40 ml toluene solution of methylaluminoxane (concentration 1 mmol/ml) was added to Solution L and reacted together at room temperature for one hour.

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution K. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 88 grams of polymer having a catalytic activity of 176 kg/gZr, MFR of 0.18 g/10 min, a bulk density of 0.46 g/cm$^3$ and a density of 0.9203 g/cm$^3$.

Comparative Example 1

Preparation of Catalyst Components

A 100 ml eggplant-typed flask equipped with an electro-magnetic induction stirrer was fed in nitrogen atmosphere with 30 ml refined toluene, 0.13 gram tetrapropoxyzirconium (Zr(On—Pr)$_4$) and 0.37 gram indene. The admixture after being stirred at room temperature for 30 minutes was added at 0° C. and for 30 minutes with droplets of 0.37 gram triethylaluminum (AlEt$_3$) and thereafter stirred at room temperature for 24 hours thereby obtaining Component (A). 40 ml toluene solution of methylaluminoxane (concentration 1 mmol/ml) was added to the solution of Component (A) and reacted together at room temperature for one hour, the resulting admixture being designated to "Solution M".

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution M. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 40.0 grams of polymer having a catalytic activity of 80 kg/gZr, MFR of 1.20 g/10 min, a bulk density of 0.46 g/cm$^3$ and a density of 0.9211 g/cm$^3$.

Comparative Example 2

Preparation of Catalyst Components

A 100 ml eggplant-typed flask equipped with an electro-magnetic induction stirrer was fed in nitrogen atmosphere with 30 ml refined toluene, 0.15 gram tetrabutoxyzirconium (Zr(On—Bu)$_4$) and 0.26 gram cyclopentadiene. The admixture after being stirred at room temperature for 30 minutes was added at 0° C. and for 30 minutes with droplets of 1.13 gram trihexylaluminum (AlHx$_3$) and thereafter stirred at room temperature for 24 hours thereby obtaining Component (A). 20 ml toluene solution of methylaluminoxane (concentration 1 mmol/ml) was added to the solution of Component (A) and reacted together at room temperature for one hour, the resulting admixture being designated to "Solution N".

A 300 ml three-necked flask equipped with a stirrer was fed in nitrogen atmosphere with 10 grams silica (surface area 300 m$^2$/g, Grade No. 952 of Fuji Devison) which had been calcined at 600° C. for 5 hours, followed by addition of total weight of Solution N. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 35.0 grams of polymer having a catalytic activity of 70 kg/gZr, MFR of 2.60 g/10 min, a bulk density of 0.46 g/cm$^3$ and a density of 0.9220 g/cm$^3$.

Comparative Example 3

Preparation of Catalyst Components

A 100 ml eggplant-typed flask equipped with an electro-magnetic induction stirrer was fed in nitrogen atmosphere with 30 ml refined toluene, 0.13 gram tetrapropoxyzirconium (Zr(On—Pr)$_4$) and 0.30 gram 1,3-dimethylcyclopentadiene. The admixture after being stirred at room temperature for 30 minutes was added at 0° C. and for 30 minutes with droplets of 0.37 gram triethylaluminum (AlEt$_3$) and thereafter stirred at room temperature for 24 hours thereby obtaining Component (A). Component (B) of 40 ml toluene solution of methylaluminoxane (concentration 1 mmol/ml) was added to the solution of Component (A). The resulting admixture was designated to "Solution O".

A 300 ml three-necked flask equipped with a stirrer was fed in nitrogen atmosphere with 10 grams silica (surface area 300 m²/g, Grade No. 952 of Fuji Devison) which had been calcined at 600° C. for 5 hours, followed by addition of total weight of Solution O. The admixture was stirred at room temperature for 2 hours and thereafter dried by nitrogen blow to remove the solvent therefrom thereby obtaining a particulate product having a good fluidity property.

Polymerization

The procedure of Example 1 was followed whereby there was obtained 64 grams of polymer having a catalytic activity of 128 kg/gZr, MFR of 0.06 g/10 min, a bulk density of 0.43 g/cm³ and a density of 0.9223 g/cm³.

What is claimed is:

1. A catalyst useful for the polymerization of olefinic polymers which comprises a composition resulting from mutual contact of the following Components (A), (B), (C) and (D):

said Component (A) being a reaction product resulting from mutual contact of components (a), (b) and (c);
said component (a) being represented by the formula

wherein $R^1$ and $R^2$ each are a $C_1$–$C_{24}$ hydrocarbon moieties, $X^1$ is a hydrogen atom or a halogen atom, $Me^1$ is titanium, zirconium or hafnium, p and q are $0 \leq p \leq 4$, $0 \leq q \leq 4$ and $0 \leq p+q \leq 4$, said component (b) being represented by the formula

wherein $R^3$ and $R^4$ each are a $C_1$–$C_{24}$ hydrocarbon moieties, $X^2$ is a hydrogen atom or a halogen atom, $Me^2$ is an element of Groups I to III in the Periodic Table, z is a valence of $Me^2$, and m and n are $0 \leq m \leq z$, $0 \leq n \leq z$ and $0 < m+n \leq z$, and said component (c) being an organocyclic compound having two or more conjugated double bonds;

said Component (B) being a modified organoaluminum compound having Al—O—Al bonds;

said Component (C) being an organocyclic compound having two or more conjugated double bonds which is different from component (c); and said Component (D) being an inorganic carrier or particulate polymer carrier.

2. A catalyst according to claim 1 wherein said Component (B) is derived from the reaction of an organoaluminum compound with water, said organoaluminum compound being of the formula

wherein $R^{17}$ is a hydrocarbon group such as an alkyl, alkenyl, aryl and aralkyl group of 1 to 18 carbon atoms, $X^7$ is a halogen or hydrogen atom, and c is an integer of $1 \leq c \leq 3$.

3. A catalyst according to claim 1 wherein said Component (C) is represented by the formula

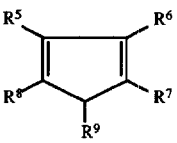

where $R^5$, $R^6$, $R^7$, $R^8$ and $R^9$ each are hydrogen or a $C_1$–$C_{10}$ hydrocarbon group, any two of these hydrocarbon groups jointly forming a cyclic hydrocarbon group.

4. A catalyst according to claim 1 wherein said Component (D) is an inorganic carrier formed from a porous inorganic compound of the group consisting of a carbonaceous material, metal, metal oxide, metal chloride, metal carbonate and mixtures thereof and having a maximum length of 5–200 μm, a surface area of 50–1,000 m²/g and pore volume of 0.05–3 cm³/g and/or a particulate polymer carrier formed from a thermoplastic or thermosetting resin having an average particle size of 5–2,000 μm.

5. A catalyst according to claim 1 wherein said component (b) is used in an amount of 0.01 to 100 mols per mol of said component (a).

6. A catalyst according to claim 1 wherein said component (c) is used in an amount of 0.01 to 100 mols per mol of said component (a).

7. A catalyst according to claim 1 wherein said Component (B) is used in an amount of from 0.1 to 100,000 by an atomic ratio of aluminum in said Component (B) to transition metal $Me^1$ in said component (a).

8. A catalyst according to claim 1 wherein said Component (C) is used in an amount of from 0.01 to 100 mols per mol of the component (a).

9. A catalyst according to claim 1 wherein said Component (D) is used in an amount of 1 gram per 0.0001–5 millimols of said component (a).

10. A catalyst according to claim 5 wherein said component (b) is used in an amount of 0.1 to 50 mols per mol of said component (a).

11. A catalyst according to claim 10 wherein said component (b) is used in an amount of 1 to 10 mols per mol of said component (a).

12. A catalyst according to claim 6 wherein said component (c) is used in an amount of 0.1 to 50 mols per mol of said component (a).

13. A catalyst according to claim 12 where said component (c) is used in an amount of 1 to 10 mols per mol of said component (a).

14. A catalyst according to claim 7 wherein said Component (B) is used in an amount of from 1 to 10,000, by an atomic ratio of aluminum in said Component (B) to transition metal $Me^1$ in said component (a).

15. A catalyst according to claim 14 wherein said Component (B) is used in an amount from 10 to 1,000, by an atomic ratio of aluminum in said Component (B) to transition metal $Me^1$ in said component (a).

16. A catalyst according to claim 8 wherein said Component (C) is used in an amount from 0.1 to 50 mols per mol of the component (a).

17. A catalyst according to claim 16 wherein said Component (C) is used in an amount of from 1 to 10 mols per mol of the component (a).

* * * * *

UNITED STATES PATENT AND TRADEMARK OFFICE
CERTIFICATE OF CORRECTION

PATENT NO.   : 5,750,454
DATED        : May 12, 1998
INVENTOR(S)  : Hiroyuki Shimizu; Akira Sano; Kazuo Matsuura It is certified that error appears in the above-indentified patent and that said Letters Patent is hereby corrected as shown below:

```
Column 2, line 31, "C1-c8" should read --C1-C8--.
Column 18, line 60, "poly-1buten" should
read --poly-1-buten--.  Column 28, line 24, "OC"
should read --0°C--.  Column 34, line 26, "100,000 by"
should read --100,000, by--.  Column 34, line 52,
"amount from" should read --amount of from--.
Column 34, line 56, "amount from" should read
--amount of from--.
```

Signed and Sealed this

Fourth Day of August, 1998

Attest:

BRUCE LEHMAN

*Attesting Officer*      *Commissioner of Patents and Trademarks*